US012745122B2

(12) United States Patent
Axmon et al.

(10) Patent No.: US 12,745,122 B2
(45) Date of Patent: Sep. 22, 2026

(54) GAP CANCELLATION IN CONCURRENT MEASUREMENT GAP PATTERNS

(71) Applicant: Telefonaktiebolaget LM Ericsson (publ), Stockholm (SE)

(72) Inventors: Joakim Axmon, Limhamn (SE); Zhixun Tang, Beijing (CN); Muhammad Ali Kazmi, Reston, VA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 177 days.

(21) Appl. No.: 18/559,080

(22) PCT Filed: Apr. 28, 2022

(86) PCT No.: PCT/SE2022/050410

§ 371 (c)(1),
(2) Date: Nov. 6, 2023

(87) PCT Pub. No.: WO2022/240332

PCT Pub. Date: Nov. 17, 2022

(65) Prior Publication Data

US 2024/0244469 A1 Jul. 18, 2024

Related U.S. Application Data

(60) Provisional application No. 63/187,207, filed on May 11, 2021.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0051* (2013.01); *H04W 72/1268* (2013.01); *H04W 72/1273* (2013.01)

(58) Field of Classification Search
CPC . H04W 24/10; H04W 72/1268; H04W 72/04; H04W 72/1273; H04L 5/0051; H04B 17/309; H04B 17/318
See application file for complete search history.

(56) References Cited

U.S. PATENT DOCUMENTS

2018/0132124 A1 5/2018 Huang et al.
2018/0324619 A1 * 11/2018 Harada ................ H04W 24/10
(Continued)

OTHER PUBLICATIONS

3GPP TS 38.133 V17.1.0; 3rd Generation Partnership Project; Technical Specification Group Radio Access Network; NR; Requirements for support of radio resource management (Release 17); Mar. 2021; consisting of 2199 pages.
(Continued)

*Primary Examiner* — Mohamed A Kamara
(74) *Attorney, Agent, or Firm* — Weisberg I.P. Law, P.A.

(57) ABSTRACT

A wireless device, WD, configured with concurrent measurement gap patterns. The WD determines, based on a threshold value, whether two measurement gaps in the concurrent measurement gap patterns are too close to each other in time. Based on the determination, the WD determines whether to use the two measurement gaps for performing measurements. In some embodiments, if the two measurement gaps are too close to each other in time, the WD cancels at least one of the two measurement gaps and/or avoids performing measurements associated with at least one of the two measurement gaps, and if the two measurement gaps are not too close to each other in time, the WD uses both of the two measurement gaps to perform measurements.

20 Claims, 17 Drawing Sheets

(51) Int. Cl.
*H04W 72/1268* (2023.01)
*H04W 72/1273* (2023.01)

(56) References Cited

U.S. PATENT DOCUMENTS

2019/0394834 A1* 12/2019 Cui ........................ H04W 24/10
2021/0029724 A1* 1/2021 Tsai .................... H04W 72/569
2021/0120513 A1* 4/2021 Siomina ................ H04W 64/00
2024/0129904 A1* 4/2024 Cabrera Mercader ........................ H04W 72/0446

OTHER PUBLICATIONS

3GPP TS 37.355 V16.4.0; 3rd Generation Partnership Project; Technical Specification Group Radio Access Network; LTE Positioning Protocol (LPP) (Release 16); Mar. 2021; consisting of 298 pages.
3GPP TS 38.101-1 V17.1.0; 3rd Generation Partnership Project; Technical Specification Group Radio Access Network; NR; User Equipment (UE) radio transmission and reception; Part 1: Range 1 Standalone (Release 17); Mar. 2021; consisting of 513 pages.
International Search Report and Written Opinion dated Jul. 21, 2022 for International Application No. PCT/SE2022/050410 filed Apr. 28, 2022; consisting of 14 pages.
3GPP TSG-RAN WG4 Meeting #101-bis-e R4-220xxxx; Title: draftCR on concurrent gaps (9.1.2B); Source to WG: Ericsson; Source to TSG: R4; Work item code: NR_MG_enh-Core; Category: B; Date and Location: Jan. 17-25, 2022, Electronic Meeting; consisting of 3 pages.
3GPP TSG-RAN4 Meeting #101-bis-e R4-2202612; Title: CR on collision handling and MG related requirements for concurrent MGs; Source to WG: Huawei, HiSilicon; Source to TSG: R4; Work item code: NR_MG_enh-Core; Category: B; Date and Location: Jan. 17-25, 2022, Electronic Meeting; consisting of 3 pages.
3GPP TSG-RAN WG4 Meeting #101bis-e R4-2202753; Title: Draft Big CR: RRM requirements Rel-17 NR MG enhancements; Source to WG: Intel, MediaTek; Source to TSG: R4; Work item code: NR_MG_ehn-core; Category: B; Date and Location: Jan. 17-25, 2022, Electronic Meeting; consisting of 82 pages.
3GPP TSG-RAN WG4 Meeting #98-e-Bis R4-2103714; Title: Email discussion summary for [98e][233] NR_MG_enh_1; Agenda item: 11.5.1 and 11.5.2.2; Source: Moderator (MediaTek inc.); Document for: Information; Date and Location: Jan. 25-Feb. 5, 2021, Electronic Meeting; consisting of 50 pages.
3GPP TSG-RAN WG4 Meeting #100-e R4-2113637; Title: Discussion on multiple concurrent and independent gap patterns; Agenda Item: 9.11.2.2; Source: Ericsson; Document for: Discussion; Date and Location: Aug. 16-27, 2021, Electronic Meeting; consisting of 10 pages.
3GPP TSG-RAN WG4 Meeting #99-e R4-210xxxx; Title: Discussion on multiple concurrent and independent gap patterns; Agenda Item: 9.10.2.2; Source: MediaTek Inc.; Document for: Discussion; Date and Location: May 19-27, 2021, Electronic Meeting; consisting of 9 pages.

* cited by examiner

GAP CANCELLATION IN CONCURRENT MEASUREMENT GAP PATTERNS

CROSS-REFERENCE TO RELATED APPLICATIONS

This application is a Submission Under 35 U.S.C. § 371 for U.S. National Stage Patent Application of International Application No.: PCT/SE2022/050410, filed Apr. 28, 2022 entitled "GAP CANCELLATION IN CONCURRENT MEASUREMENT GAP PATTERNS," which claims priority to U.S. Provisional Application No.: 63/187,207, filed May 11, 2021, entitled "ADAPTIVE CANCELLATION OF GAP IN CONCURRENT MEASUREMENT GAP PATTERNS," the entireties of both of which are incorporated herein by reference.

TECHNICAL FIELD

The present disclosure relates to wireless communications, and in particular, to adaptive cancellation of a gap in concurrent measurement gap patterns.

BACKGROUND

Measurement Gaps

A measurement gap pattern (MGP) may be used by a wireless device (WD, also called user equipment or UE) for performing measurements on cells of the non-serving carriers (e.g., inter-frequency carrier, inter-RAT carriers etc.). In the 3$^{rd}$ Generation Partnership Project (3GPP) New Radio (NR, also called 5th Generation or 5G) gaps are also used for measurements on cells of the serving carrier in some scenarios e.g., if the measured signals (e.g., synchronization signal block (SSB)) are outside the bandwidth part (BWP) of the serving cell. The WD is scheduled in the serving cell only within the BWP. During the gap the WD cannot be scheduled for receiving/transmitting signals in the serving cell. A measurement gap pattern may be characterized or defined by several parameters: measurement gap length (MGL), measurement gap repetition period (MGRP) and measurement gap time offset with respect to reference time (e.g., slot offset with respect to serving cell's system frame number, SFN, such as SFN=0). An example of MGP is shown in FIG. 1. As an example, MGL can be 1.5, 3, 3.5, 4, 5.5 or 6 ms, and MGRP can be 20, 40, 80 or 160 ms. Such type of MGP is configured by the network node and is also called network controlled or network configurable MGP. Therefore the serving network node (for example a base station) is fully aware of the timing of each gap within the MGP.

In NR there are two major categories of MGPs: per-WD measurement gap patterns and per-FR (frequency range) measurement gap patterns. In NR the spectrum is divided into two frequency ranges namely FR1 and FR2. FR1 is currently defined from 410 MHz to 7125 MHz. FR2 range is currently defined from 24250 MHz to 52600 MHZ. The FR2 range is also interchangeably called millimeter wave (mmwave) and corresponding bands in FR2 are called mmwave bands. In the future, more frequency ranges can be specified, for example FR3. An example of FR3 may be frequencies ranging above 52600 MHz or between 52600 MHz and 71000 MHz or between 7125 MHz and 24250 MHz.

When configured with per-WD MGP, the WD creates gaps on all the serving cells (e.g., PCell, PSCell, SCells, etc.) regardless of their frequency range. The per-WD MGP can be used by the WD for performing measurements on cells of any carrier frequency belonging to any RAT (Radio access technology) or frequency range (FR). When configured with per-FR MGP (if WD supports this capability), the WD creates gaps only on the serving cells of the indicated FR whose carriers are to be measured. For example, if the WD is configured with per-FR1 MGP then the WD creates measurement gaps only on serving cells (e.g., PCell, PSCell, SCells, etc.) of FR1 while no gaps are created on serving cells on carriers of FR2. The per-FR1 gaps can be used for measurement on cells of only FR1 carriers. Similarly, per-FR2 gaps when configured are only created on FR2 serving cells and can be used for measurement on cells of only FR2 carriers. Support for per FR gaps is a WD capability, i.e., certain WD may only support per WD gaps according to their capability.

A radio resource control (RRC) message for measurement gap configuration provided by a network node to a WD is shown below:

MeasGapConfig

The IE MeasGapConfig specifies the measurement gap configuration and controls setup/release of measurement gaps.

MeasGapConfig information element

```
-- ASN1START
-- TAG-MEASGAPCONFIG-START
MeasGapConfig ::=              SEQUENCE {
  gapFR2              SetupRelease { GapConfig }      OPTIONAL,    -- Need M
  ...,
  [[
  gapFR1              SetupRelease { GapConfig }      OPTIONAL,    -- Need M
  gapUE               SetupRelease { GapConfig }      OPTIONAL     -- Need M
  ]]
}
GapConfig ::=          SEQUENCE {
  gapOffset            INTEGER (0..159),
  mgl                 ENUMERATED {ms1dot5, ms3, ms3dot5, ms4, ms5dot5, ms6},
  mgrp                 ENUMERATED {ms20, ms40, ms80, ms160},
  mgta                 ENUMERATED {ms0, ms0dot25, ms0dot5},
  ...,
  [[
```

-continued

```
  refServCellIndicator                ENUMERATED {pCell, pSCell, mcg-FR2} OPTIONAL   --
Cond NEDCorNRDC
  ]],
  [[
  refFR2ServCellAsyncCA-r16           ServCellIndex        OPTIONAL,          -- Cond
  AsyncCA
  mgl-r16                ENUMERATED {ms10, ms20}           OPTIONAL           -- Cond PRS
  ]]
}
-- TAG-MEASGAPCONFIG-STOP
-- ASN1STOP
```

| MeasGapConfig field descriptions |
|---|
| gapFR1<br>Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14]. |
| gapFR2<br>Indicates measurement gap configuration applies to FR2 only. In (NG)EN-DC or NE-DC, gapFR2 can only be set up by NR RRC (i.e. LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133 [14]. |
| gapUE<br>Indicates measurement gap configuration that applies to all frequencies (FR1 and FR2). In (NG)EN-DC, gapUE cannot be set up by NR RRC (i.e. only LTE RRC can configure per UE measurement gap). In NE-DC, gapUE can only be set up by NR RRC (i.e. LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133 [14]. |
| gapOffset<br>Value gapOffset is the gap offset of the gap pattern with MGRP indicated in the field mgrp. The value range is from 0 to mgrp-1. |
| mgl<br>Value mgl is the measurement gap length in ms of the measurement gap. The measurement gap length is according to in Table 9.1.2-1 in TS 38.133 [14]. Value ms1dot5 corresponds to 1.5 ms, ms3 corresponds to 3 ms and so on. If mgl-r16 is present, UE shall ignore the mgl (without suffix). |
| mgrp<br>Value mgrp is measurement gap repetition period in (ms) of the measurement gap. The measurement gap repetition period is according to Table 9.1.2-1 in TS 38.133 [14]. |
| mgta<br>Value mgta is the measurement gap timing advance in ms. The applicability of the measurement gap timing advance is according to clause 9.1.2 of TS 38.133 [14]. Value ms0 corresponds to 0 ms, ms0dot25 corresponds to 0.25 ms and ms0dot5 corresponds to 0.5 ms. For FR2, the network only configures 0 ms and 0.25 ms. |
| refFR2ServCellIAsyncCA<br>Indicates the FR2 serving cell identifier whose SFN and subframe is used for FR2 gap calculation for this gap pattern with asynchronous CA involving FR2 carrier(s). |
| refServCellIndicator<br>Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

| Conditional Presence | Explanation |
|---|---|
| AsyncCA | This field is mandatory present when configuring FR2 gap pattern to UE in:<br>(NG)EN-DC or NR SA with asynchronous CA involving FR2 carrier(s);<br>NE-DC or NR-DC with asynchronous CA involving FR2 carrier(s), if the field refServCellIndicator is set to mcg-FR2.<br>In case the gap pattern to UE in NE-DC and NR-DC is already configured and the serving cell used for the gap calculation corresponds to a serving cell on FR2 frequency in MCG, then the field is optionally present, need M. Otherwise, it is absent, Need R. |
| NEDCorNRDC | This field is mandatory present when configuring gap pattern to UE in NE-DC or NR-DC. In case the gap pattern to UE in NE-DC and NR-DC is already configured, then the field is absent, need M. Otherwise, it is absent. |

-continued

| | |
|---|---|
| PRS | This field is optionally present, Need R, when configuring gap pattern to UE for measurements of DL-PRS configured via LPP (TS 37.355 [49]). Otherwise, it is absent. |

Concurrent Gaps

In NR 3GPP Release 17 (Rel-17) work is ongoing for introducing concurrent measurement gap patterns (MGP), i.e., support of at least two measurement gap patterns that are configured during the same period of time.

RAN4 has identified five major scenarios for concurrent gaps, see FIG. 2. The scenario in FIG. 2(*a*) illustrates two fully non-overlapping measurement gap patterns. Although here the measurement gap repetition periods (MGRP) are illustrated as being the same for both measurement gap patterns, this is not a requirement for the scenario to apply; MGRPs can differ between the MGPs, e.g., one MGRP may be 40 ms and the other 40 ms or 80 ms, and the scenario is fulfilled as long as measurement gaps in one MGP never overlap, neither partially nor fully, with a measurement gap in another MGP. In standardization discussions this scenario is referred to as the fully non-overlapping (FNO) scenario.

The scenarios in FIG. 2(*b*) illustrate two fully overlapping measurement gap patterns. In either case, one MGP is always contained within the other, and the MGRPs for the two MGPs are the same MGRP. In standardization discussions these scenarios are referred to as fully overlapping (FO) scenarios.

The scenario in FIG. 2(*c*) illustrates two measurement gap patterns whose gaps consistently partially overlap each other. Both MGPs have the same MGRP. In the standardization discussions this scenario is referred to as the fully-partial overlapped (FPO) scenario.

The scenario in FIG. 2(*d*) illustrates two measurement gap patterns that at least occasionally fully overlap each other. For this scenario to apply, the MGRPs have to be different, e.g., one MGRP 40 ms and the other MGRP 80 ms. In the standard this scenario is referred to as the partially-fully overlapped (PFO) scenario.

The scenario in FIG. 2(*e*) illustrates two measurement gap patterns whose gaps at least occasionally partially overlap each other. For this scenario to apply, the MGRPs for the two measurement gap patterns have to be different, e.g., one MGRP is 40 ms and the other MGRP is 80 ms. In the standardization discussion this scenario is referred to as the partially-partial overlapped (PPO) scenario.

It has been considered in the 3GPP RAN4 working group that radio resource management (RRM) requirements are to be defined at least for the FNO scenario.

SUMMARY

A first aspect provides embodiments of a method implemented in a wireless device (WD) which has been configured with concurrent measurement gap patterns. The method comprises determining, based on a threshold value, whether two measurement gaps in the concurrent measurement gap patterns are too close to each other in time. The method comprises, based on the determination, determining whether to use the two measurement gaps for performing measurements.

A second aspect provides embodiments of a corresponding WD.

A third aspect provides embodiments of a method implemented in a network node. The network node is configured to communicate with a WD which has been configured with concurrent measurement gap patterns. The method comprises determining, based on a threshold value, whether two measurement gaps in the concurrent measurement gap patterns are too close to each other in time. The method comprises based on the determination, determining whether to permit the WD to use the two measurement gaps for measurements.

A fourth aspect provides embodiments of a corresponding network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

When concurrent measurement gaps are introduced, there is a chance that at least occasionally gaps from two measurement gap patterns will occur close in time, by which it can create significant outage in the communication. The outage is due to that WD either cannot receive on the downlink (DL), cannot transmit on uplink (UL), or both depending on duplex mode. When WD cannot transmit on the uplink, this may impact also hybrid automatic repeat request (HARQ) feedback for transport blocks received on the DL. Without HARQ feedback on transport blocks transmitted to the WD, the network does not know whether the transports blocks were received or not.

Figure 1:
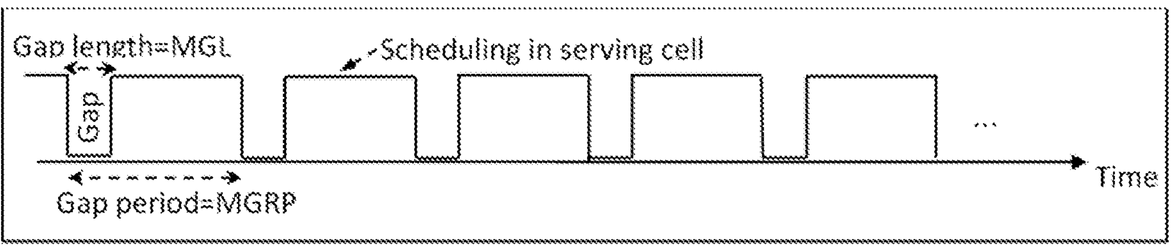
FIG. 1 illustrates an example of the measurement gap pattern in NR.
Figure 2:
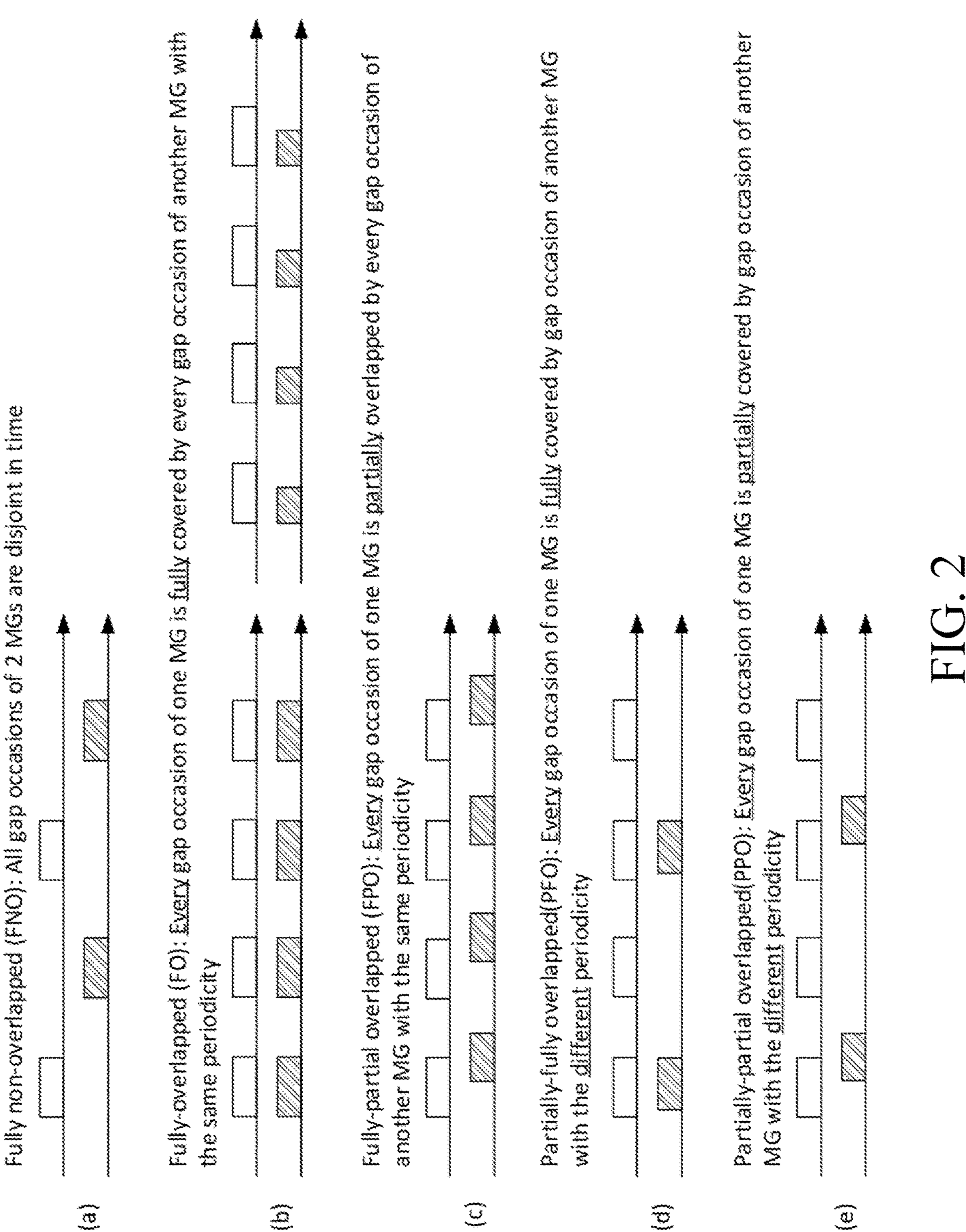
FIG. 2 illustrates an example of scenarios for concurrent measurement gaps as identified by RAN4.
Figure 3:
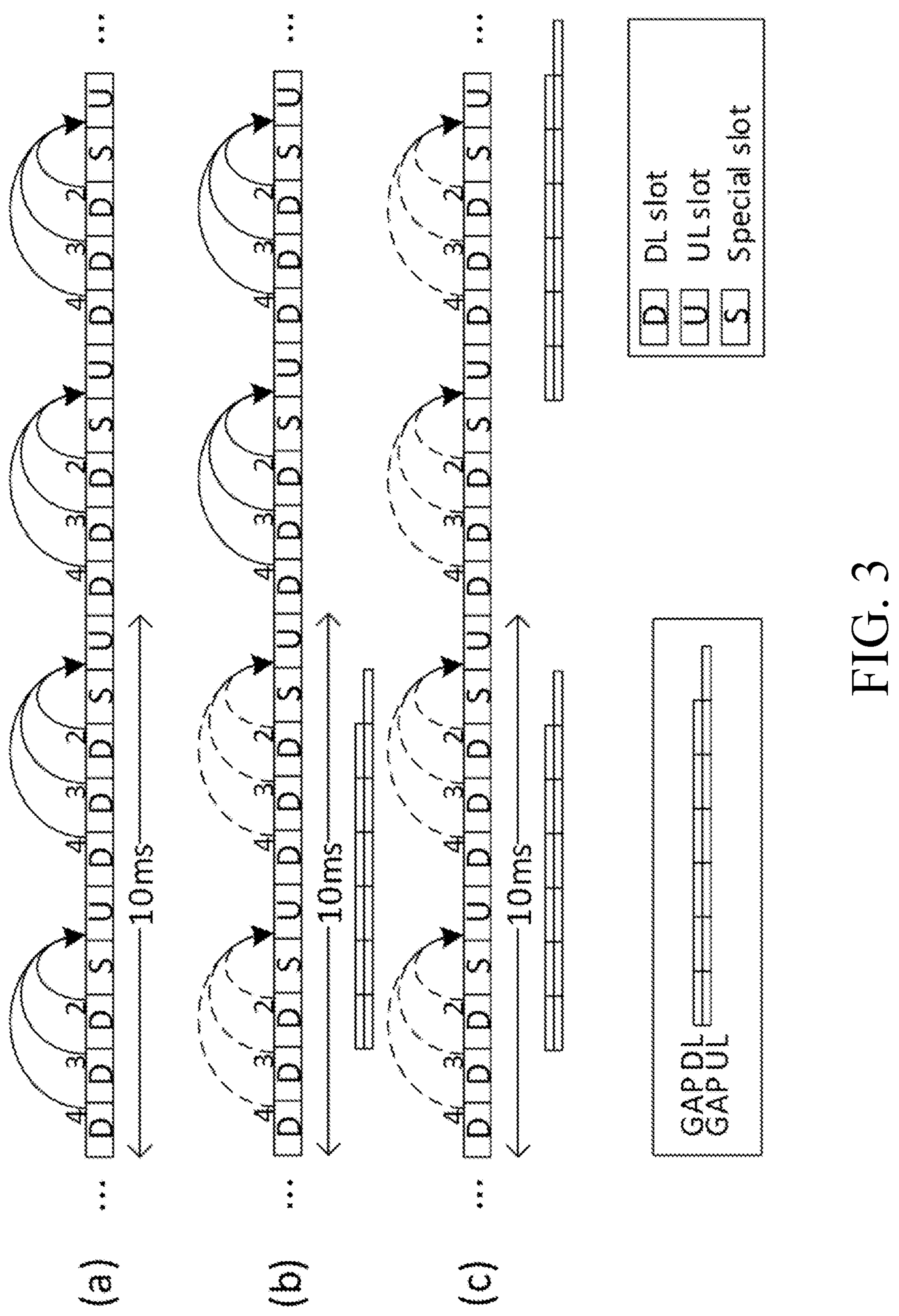
FIG. 3 illustrates an example of acknowledgement/non-acknowledgement (ACK/NACK) feedback and impact of gaps (for a typical time division duplex, TDD, configuration in NR FR1 for subcarrier spacing, SCS, 15 kHz as specified in 3GPP TS 38.101-1 A.3.3.1)
Figure 4:
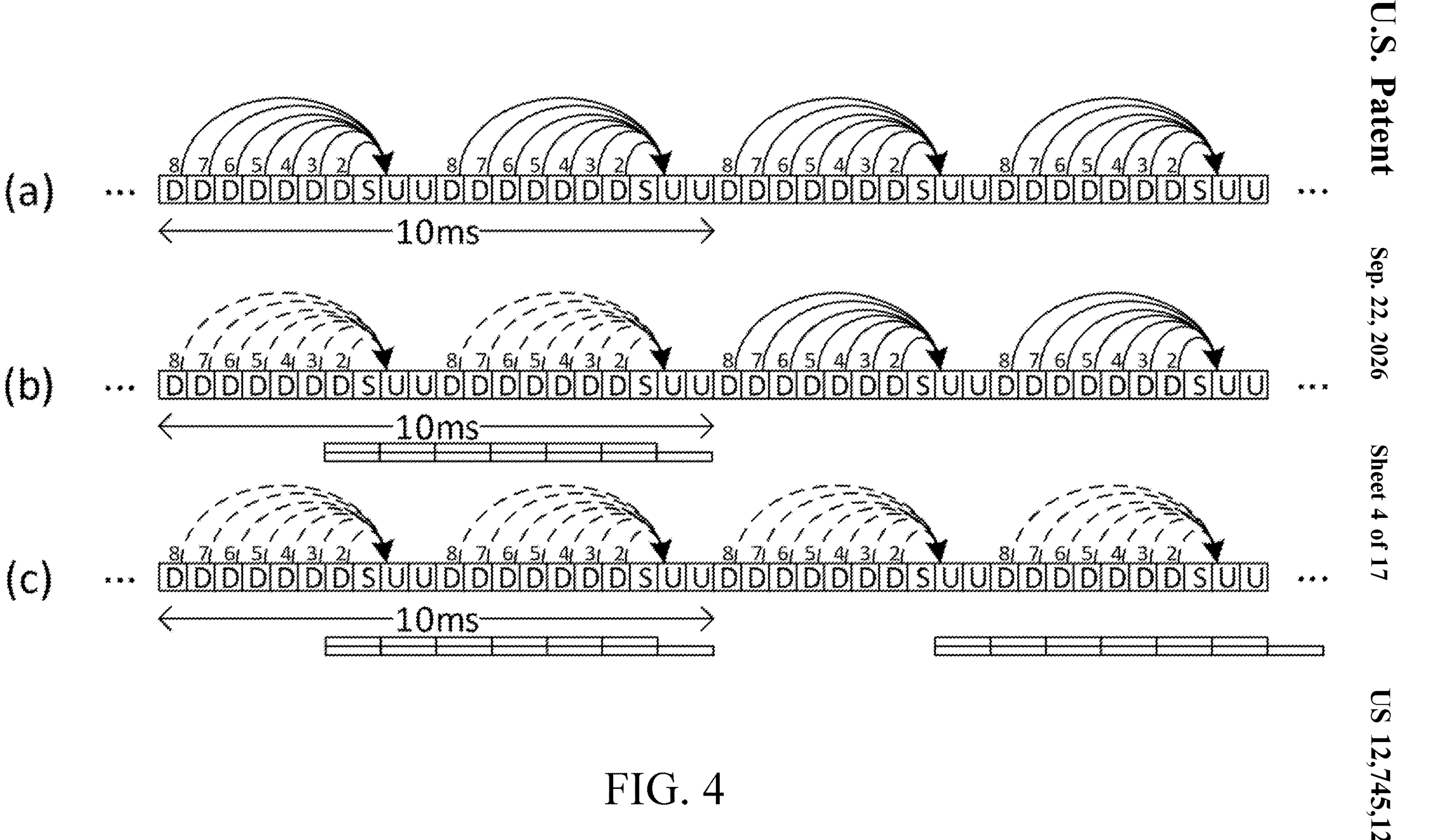
FIG. 4 illustrates an example of ACK/NACK feedback and impact of gaps (for a typical TDD configuration in NR FR1 for SCS 30 KHz as specified in 3GPP TS 38.101-1 A.3.3.1)
Figure 5:
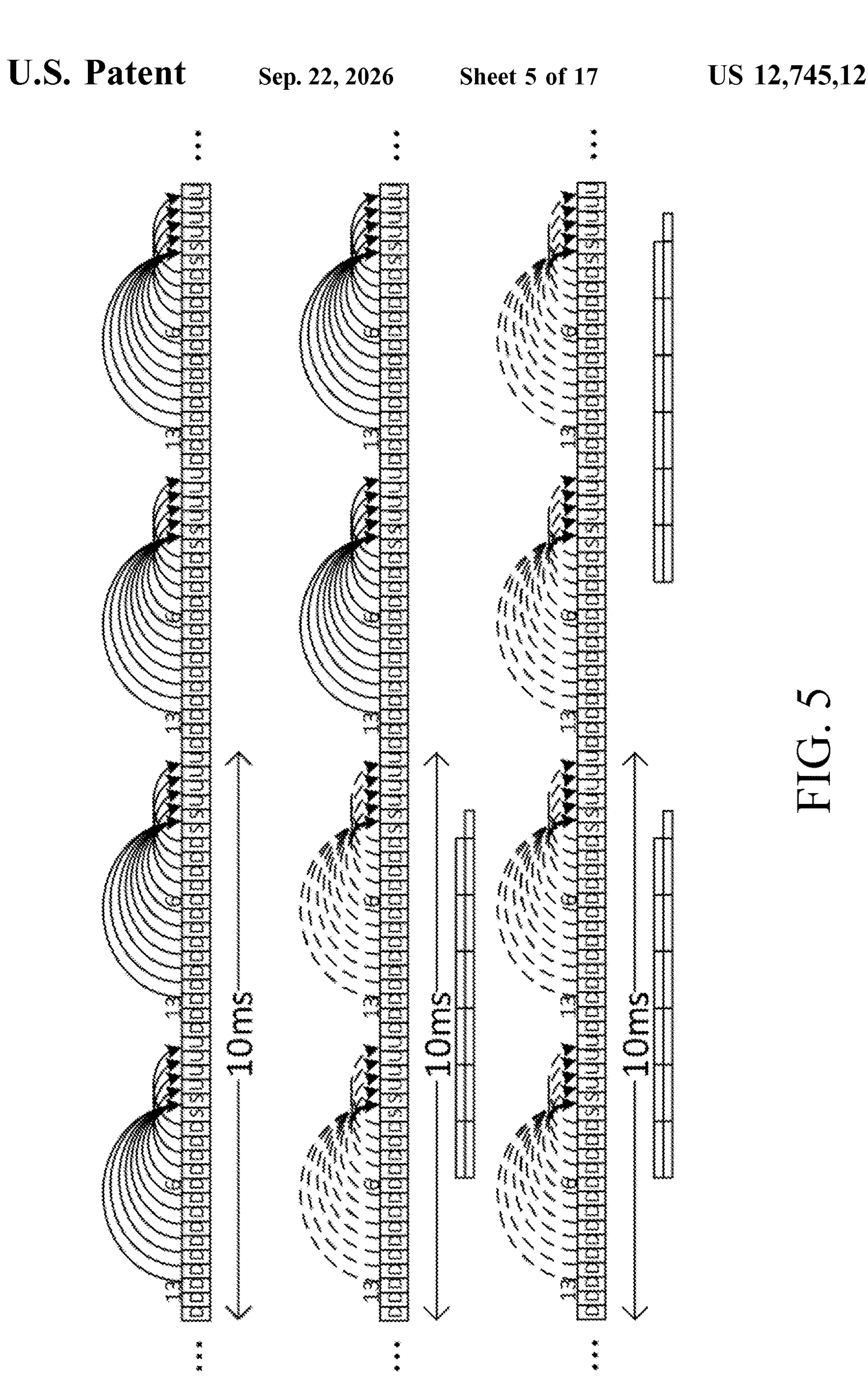
FIG. 5 illustrates an example of ACK/NACK feedback and impact of gaps (for typical TDD configuration in NR FR1 for SCS 60 kHz as specified in 3GPP TS 38.101-1 A.3.3.1)

The impact of measurement gaps is illustrated by the following examples using typical TDD configurations for subcarrier spacing (SCS) 15, 30 and 60 KHz in FR1; see FIGS. 3, 4 and 5.

In panel (a) of FIGS. 3, 4 and 5, downlink slots, uplink slots, and special slots (i.e., slots not fully downlink or not fully uplink) are illustrated. The arrows indicate in which uplink slot an ACK/NACK (HARQ feedback) pertaining to a received transport block on the downlink, is to be provided.

In panel (b) FIGS. 3, 4 and 5, the impact of a measurement gap on reception and transmission is illustrated. Here the measurement gap is 6 ms on the downlink and 6 ms+1 or 2 slots on the uplink. Dashed arrows indicate missed reception and/or transmission opportunities due to the measurement gap. It can be seen that one measurement gap during the illustrated 20 ms can cause an outage of 10 ms.

In panel (c) FIGS. 3, 4 and 5, the impact of two closely separated measurement gaps on reception and transmission is illustrated. It can be seen that at least in worst case, the two closely separated measurement gaps can cause a complete outage in the communication over the illustrated 20 ms.

A network node (e.g., gNB (5G base station), NodeB, base station) implementation may handle scheduling around measurement gaps in different ways. Some network node implementations may take gaps into account in the scheduling of the WD, whereas other network node implementations may not do so but may instead take increased ACK/NACK loss into account e.g., in the outer loop link adaptation. In either case, two measurement gaps in close proximity may result in increased latency in the communication. At least for certain scenarios, e.g., when low latency is needed, an outage of e.g., 20 ms or more may be undesirable or even unacceptable.

Hence, a method in a WD for avoiding excessive outage in the communication when concurrent gaps are configured is provided herein.

Some embodiments include methods in a WD and in a network node. In a first embodiment, a method in a WD comprises determining based on one or more rules whether any two measurement gaps in a concurrent measurement gap pattern are close to each other in time, or not. If the WD determines that the gaps are close to each other in time, then the WD further determines based on one or more rules, which one of the gaps the WD can cancel, and further cancels the determined gap. If the WD determines that the gaps are not close to each other in time, then the WD continues using the gaps for performing the measurements.

For example, the WD determines whether the gaps are close to each other in time, by comparing the magnitude of the difference (T11−T21) between the starting points in time of the individual gaps in time with certain threshold (Δ). The threshold (Δ) may further be determined based on one or more criteria e.g., whether the WD is scheduled in DL and/or in UL etc.

In some embodiments, the WD is determining based on one or more rules whether any two measurement gaps in a concurrent measurement gap pattern are close to each other in time, or not.

In some embodiments, the WD determines that the gaps are close to each other in time, then the WD further determines based on one or more rules, which one of the measurement gaps the WD shall cancel.

In some embodiments, during the radio time overlapped by the cancelled gap, the WD continues with regular operations for unicast and multicast communication, e.g., monitors PDCCH (Physical downlink control channel) on downlink, receives data on PDSCH (Physical downlink shared channel), carries out intra-frequency RRM measurements, transmits on PUCCH (Physical uplink control channel), PUSCH (Physical uplink shared channel) and transmits SRS (sounding reference signal).

In some embodiments, a network node that otherwise would not schedule a WD during gaps may carry out the same determining steps as in the WD, and may continue to schedule WD, if called for, during radio time that is overlapped by the cancelled measurement gap.

An advantage of at least some of the embodiments presented herein is that the latency can be reduced by preventing outage in the communication caused by measurement gaps being too close in time Before describing in detail exemplary embodiments, it is noted that the embodiments reside primarily in combinations of apparatus components and processing steps related to adaptive cancellation of gap in concurrent measurement gap patterns. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for adaptive cancellation of gap in concurrent measurement gap patterns.

Figure 6:
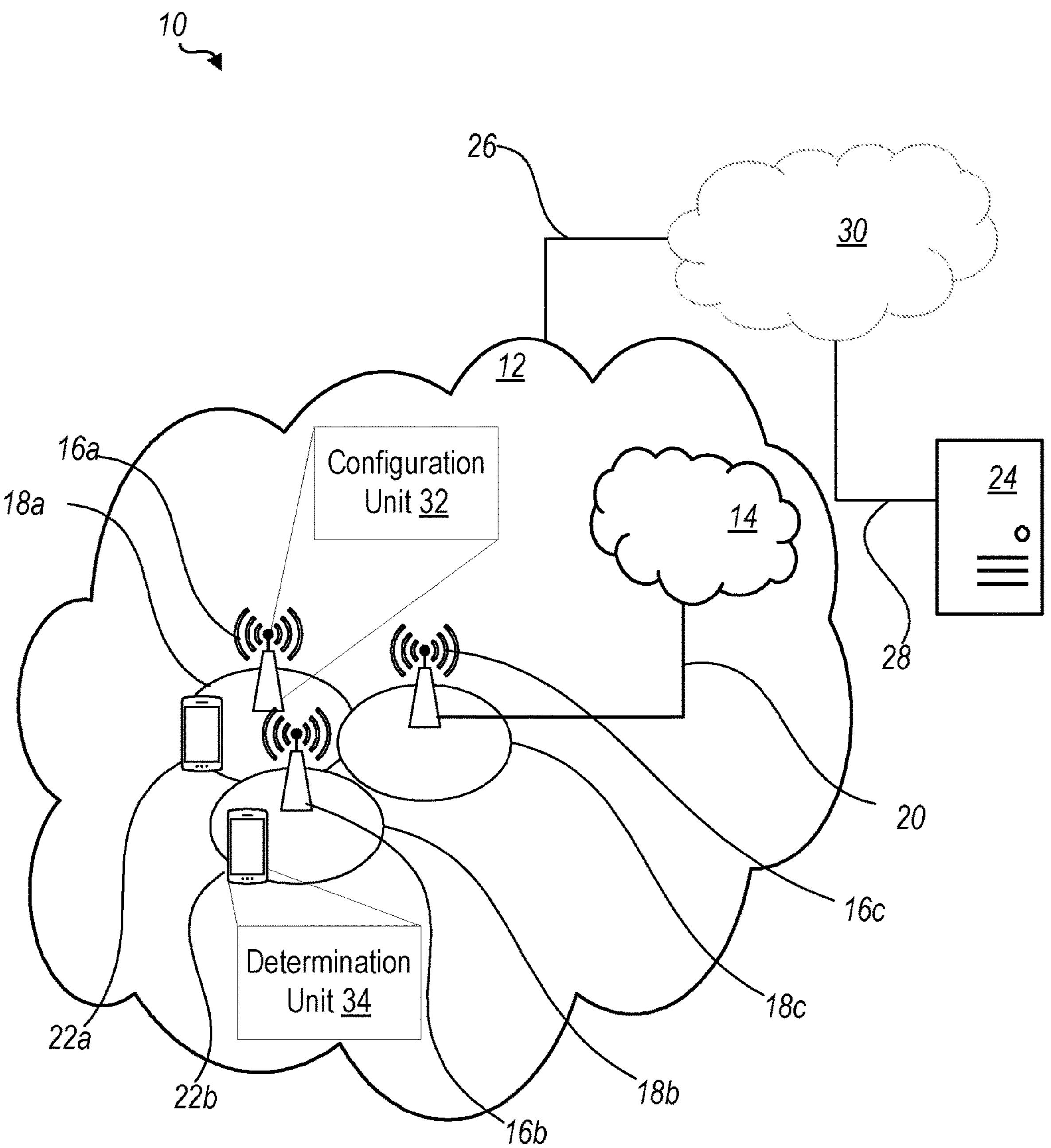
FIG. 6 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 6 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16_a_, 16_b_, 16_c_ (referred to collectively as network nodes 16), such as NBs, eNBs, gNBs or other types of wireless access points, each defining a corresponding coverage area 18_a_, 18_b_, 18_c_ (referred to collectively as coverage areas 18). Each network node 16_a_, 16_b_, 16_c_ is connectable to the core network 14 over a wired or wireless connection 20. A first wireless device (WD) 22_a_ located in coverage area 18_a_ is configured to wirelessly connect to, or be paged by, the corresponding network node 16_a_. A second WD 22_b_ in coverage area 18_b_ is wirelessly connectable to the corresponding network node 16_b_. While a plurality of WDs 22_a_, 22_b_ (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a configuration unit 32 which is configured to determine whether two measurement gaps in a concurrent measurement gap pattern are close to each other in time; and based on the determination, determine whether to permit the WD to use the two measurement gaps. A wireless device 22 is configured to include a determination unit 34 which is configured to determine whether two measurement gaps in a concurrent measurement gap pattern are close to each other in time; and based on the determination, determine whether to permit the WD to use the two measurement gaps.

Example implementations, in accordance with an embodiment, of the WD 22, network node 16 and host computer 24 discussed in the preceding paragraphs will now be described with reference to FIG. 7. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform network node methods discussed herein, such as the methods discussed with reference to FIG. 12 as well as other figures.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a determination unit 34 configured to perform WD methods discussed herein, such as the methods discussed with reference to FIG. 13 as well as other figures.

Figure 7:
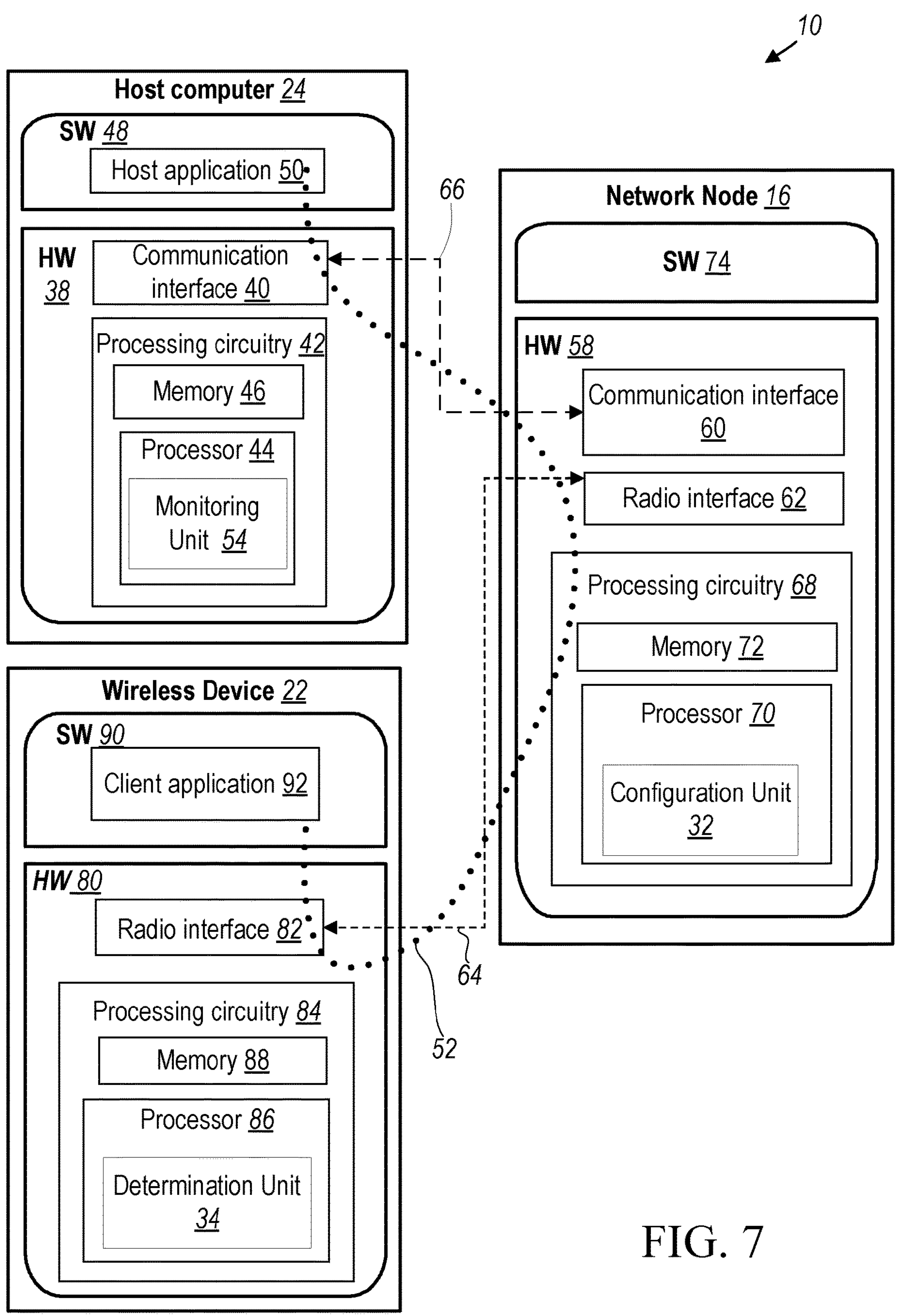
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as configuration unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 8, 9:
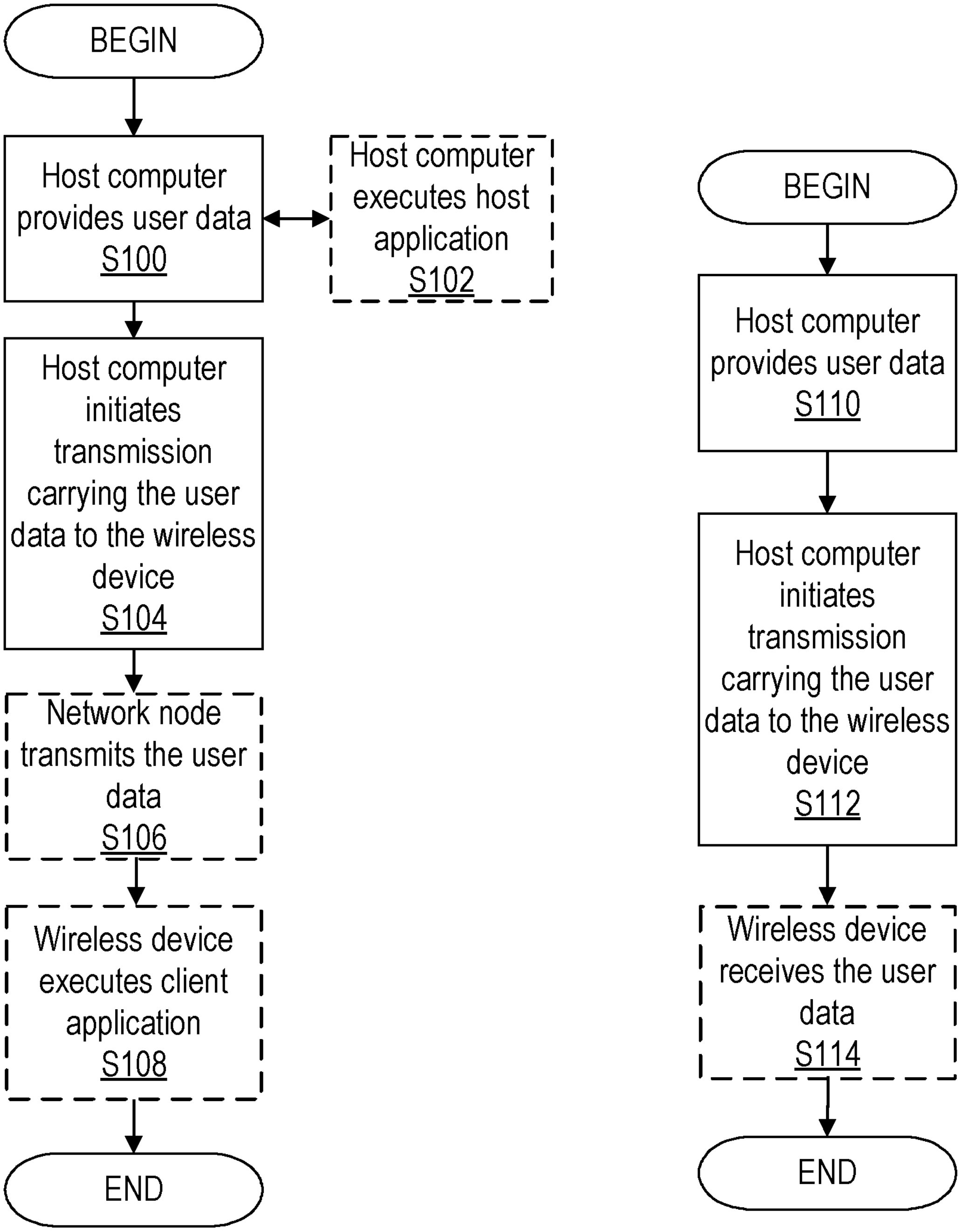
FIG. 8 is a flowchart illustrating exemplary methods implemented in a communication system including a host computer, a network node and a wireless device for executing a client application at a wireless device according to some embodiments of the present disclosure.
FIG. 9 is a flowchart illustrating exemplary methods implemented in a communication system including a host computer, a network node and a wireless device for receiving user data at a wireless device according to some embodiments of the present disclosure.

FIG. 8 is a flowchart illustrating an exemplary method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 9 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 10, 11:
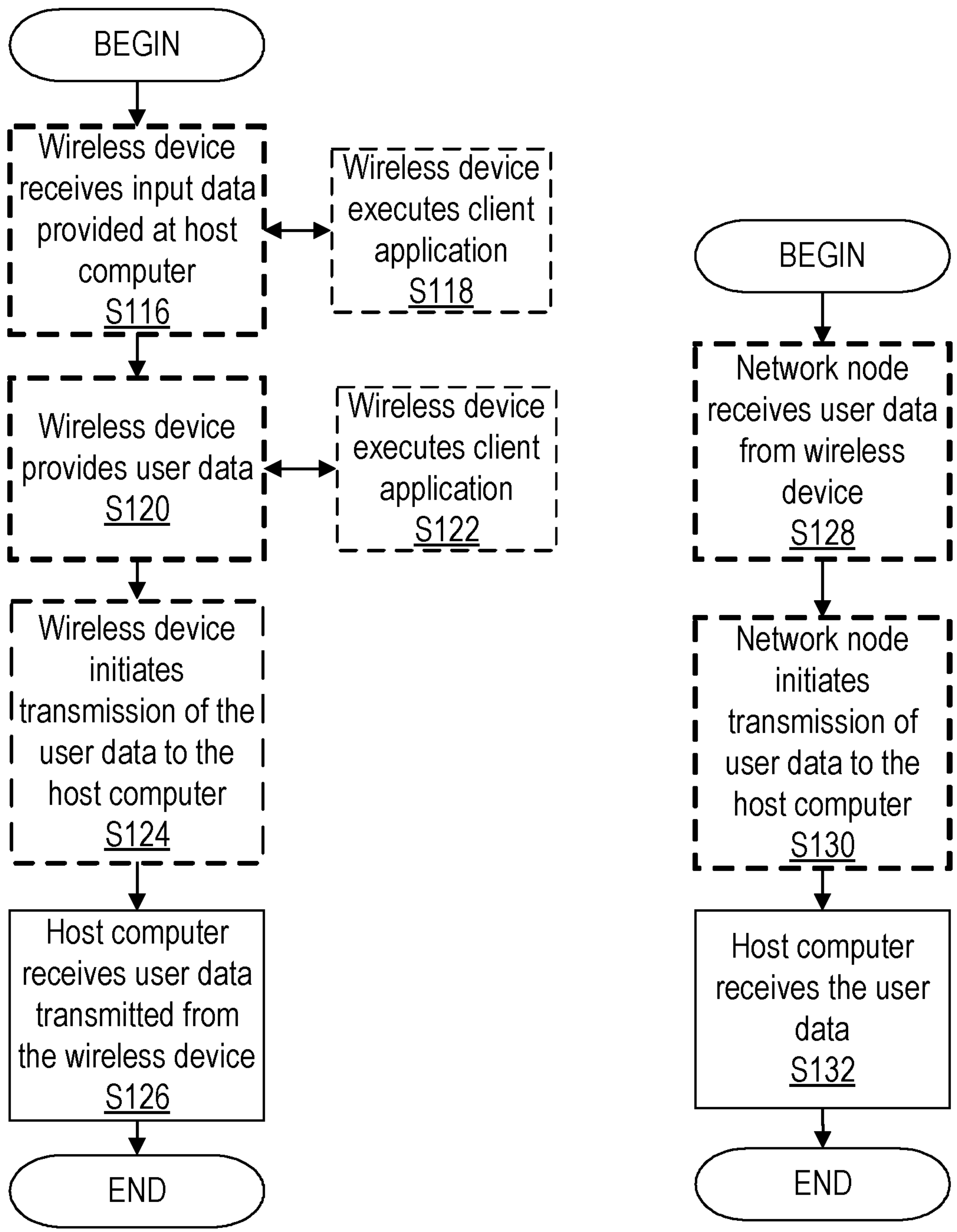
FIG. 10 is a flowchart illustrating exemplary methods implemented in a communication system including a host computer, a network node and a wireless device for receiving user data from the wireless device at a host computer according to some embodiments of the present disclosure.
FIG. 11 is a flowchart illustrating exemplary methods implemented in a communication system including a host computer, a network node and a wireless device for receiving user data at a host computer according to some embodiments of the present disclosure.

FIG. 10 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 11 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Some embodiments advantageously provide methods, systems, and apparatuses for adaptive cancellation of gap in concurrent measurement gap patterns.

In one embodiment, a network node is configured to determine whether two measurement gaps in a concurrent measurement gap pattern are close to each other in time; and based on the determination, determine whether to permit the WD to use the two measurement gaps.

In one embodiment, a wireless device is configured to determine whether two measurement gaps in a concurrent measurement gap pattern are close to each other in time; and based on the determination, determine whether to use the two gaps for performing measurements.

Figure 12:
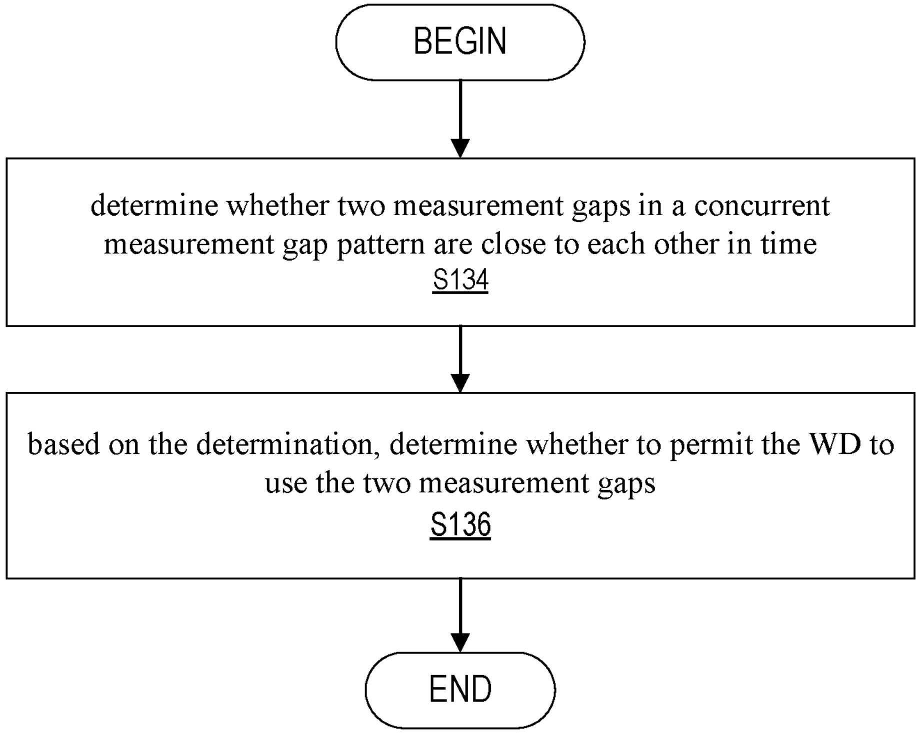
FIG. 12 is a flowchart of an exemplary process in a network node according to some embodiments of the present disclosure.

FIG. 12 is a flowchart of an exemplary process in a network node 16 according to some embodiments of the present disclosure. One or more Blocks and/or functions and/or methods performed by the network node 16 may be performed by one or more elements of network node 16 such as by configuration unit 32 in processing circuitry 68, processor 70, radio interface 62, etc. according to the example method. The example method includes determining (Block S134), such as via configuration unit 32, processing circuitry 68, processor 70 and/or radio interface 62, whether two measurement gaps in a concurrent measurement gap pattern are close to each other in time. The method includes based on the determination, determining (Block S136), such as by configuration unit 32 in processing circuitry 68, processor 70, radio interface 62, whether to permit the WD to use the two measurement gaps.

In some embodiments, the method includes determining, such as by configuration unit 32 in processing circuitry 68, processor 70, radio interface 62, whether the two measurement gaps are close to each other in time based on a threshold value. In some embodiments, determining whether to permit the WD to use the two measurement gaps comprises: when the two measurement gaps are close to each other, cancelling, such as by configuration unit 32 in processing circuitry 68, processor 70, radio interface 62, the at least one measurement gap and/or determining to schedule the WD in the at least one measurement gap; and when the two measurement gaps are not close to each other, determining, such as by configuration unit 32 in processing circuitry 68, processor 70, radio interface 62, to avoid scheduling the WD in the at least measurement gap.

Figure 13:
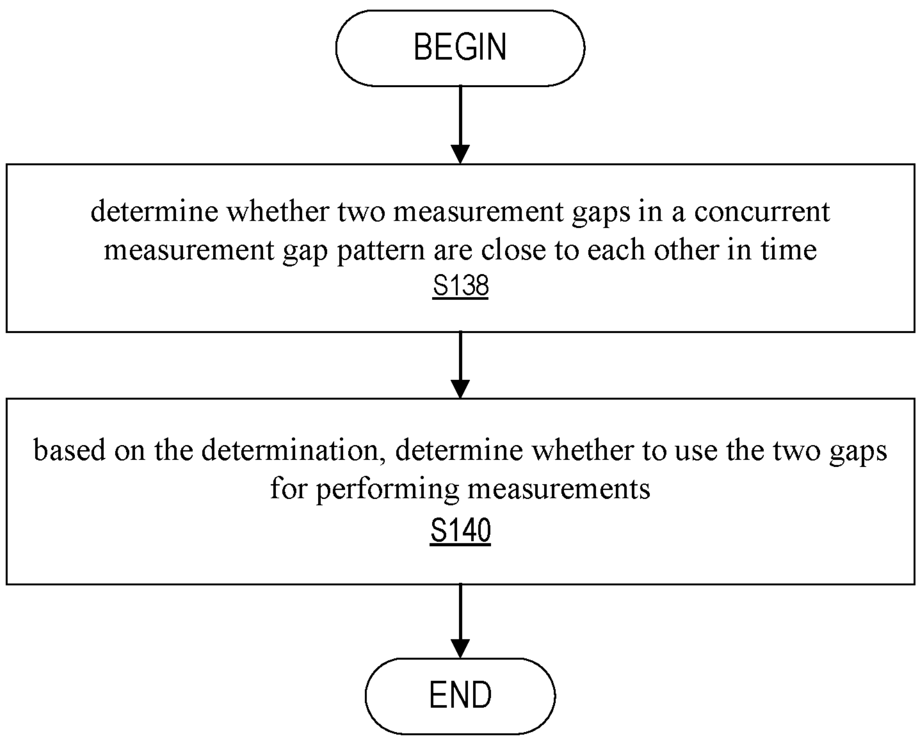
FIG. 13 is a flowchart of an exemplary process in a wireless device according to some embodiments of the present disclosure.

FIG. 13 is a flowchart of an exemplary process in a wireless device 22 according to some embodiments of the present disclosure. One or more Blocks and/or functions and/or methods performed by WD 22 may be performed by one or more elements of WD 22 such as by determination unit 34 in processing circuitry 84, processor 86, radio interface 82, etc. The example method includes determining (Block S138), such as via determination unit 34, processing circuitry 84, processor 86 and/or radio interface 82, whether two measurement gaps in a concurrent measurement gap pattern are close to each other in time. The method includes based on the determination, determining (Block S140), such as via determination unit 34, processing circuitry 84, processor 86 and/or radio interface 82, whether to use the two gaps for performing measurements.

In some embodiments, the method includes determining, such as via determination unit 34, processing circuitry 84, processor 86 and/or radio interface 82, whether the two measurement gaps are close to each other in time based on a threshold value. In some embodiments, determining whether to use the two gaps for performing measurements comprises: when the two measurement gaps are close to each other, cancelling, such as via determination unit 34, processing circuitry 84, processor 86 and/or radio interface 82, at least one measurement gap and/or avoid performing measurements during the cancelled at least one measurement gap;

and when the two measurement gaps are not close to each other, determining, such as via determination unit 34, processing circuitry 84, processor 86 and/or radio interface 82, to use the at least measurement gap to perform measurements.

Having described the general process flow of arrangements of the disclosure and having provided examples of hardware and software arrangements for implementing the processes and functions of the disclosure, the sections below provide details and examples of arrangements for adaptive cancellation of gap in concurrent measurement gap patterns, which may be implemented by the network node 16, wireless device 22 and/or host computer 24.

Scenario Description

In some embodiments, the WD 22 is configured with at least a first and a second measurement gap pattern (MGP). Each of the measurement gap patterns is characterized by a measurement gap length (MGL), a measurement gap repetition period (MGRP), a measurement gap offset (MGO) relating the measurement gap e.g., to the frame border of system frame number (SFN) 0, and a measurement gap timing advance (MGTA) which may shift the position of the measurement gap by 0, 0.25 or 0.5 ms relative to the measurement gap starting point given by MGO.

Scenario A

In a first scenario, Scenario A, the first and the second MGPs, MGP1 and MGP2, respectively, have different MGRPs, MGRP1 and MGRP2, respectively, and without loss of generality we assume that MGRP1<MGRP2. It is further assumed for this scenario that a measurement gap from MGP1 does not even occasionally overlap partially or fully with a measurement gap from MGP2. Hence the MGO for each MGP, MGO1 and MGO2, are different, and additionally, MGO1 and modulo(MGO2,MGRP1) are different.

Figure 14:
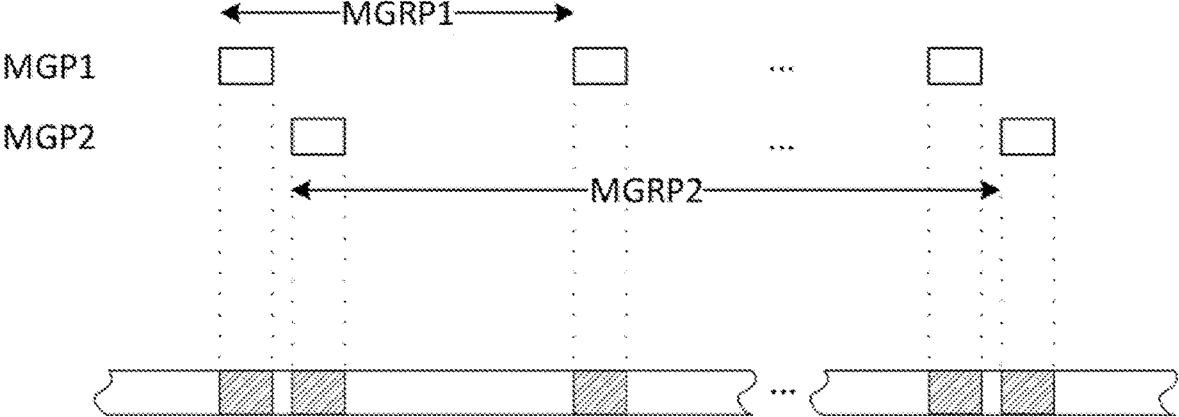
FIG. 14 is an illustration of Scenario A (dashed areas indicate position of measurement gaps) according to some embodiments.

The scenario is illustrated in FIG. 14. As illustrated, depending on configuration of the MGPs, some measurement gaps may come close in time, and as shown above (see for example FIGS. 3-5 and the associated text), it may have a negative impact on at least the latency in the communication if both gaps are used by the WD 22.

Scenario B

In a second scenario, Scenario B, the first and the second MGPs, MGP1 and MGP2, respectively, have same MGRPs, i.e., value of MGRP1 is same as for MGRP2. It is further assumed for this scenario that the measurement gaps from MGP1 and MGP2 do not overlap partially or fully. Hence the MGO for each MGP, MGO1 and MGO2, are different. Without loss of generality, we assume that MGO1<MGO2.

Figure 15:
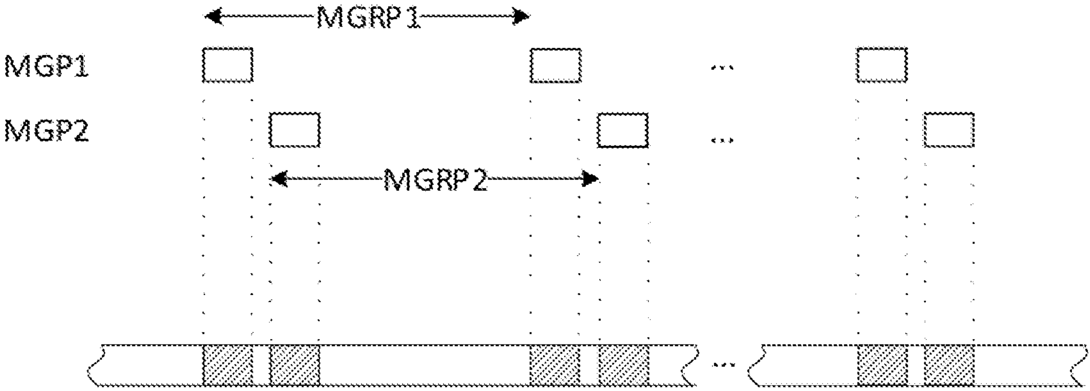
FIG. 15 is an illustration of Scenario B (dashed areas indicate position of measurement gaps) according to some embodiments.

The scenario is illustrated in FIG. 15. As illustrated, depending on configuration of the MGPs the measurement gaps may come close in time, and as shown above (see for example FIGS. 3-5 and the associated text), it may have a negative impact on at least the latency in the communication if both gaps are used by the WD 22.

Method in a WD 22 for Reducing Latency in the Communication Due to Concurrent Gaps In some embodiments, the WD 22 may impose a limit on how close in time two measurement gaps are allowed for both measurement gaps to be used. If two measurement gaps are too close in time, the WD 22 may cancel one of them i.e.

may assume that the measurement gap is not there and continue to receive on downlink (monitor a physical downlink control channel (PDCCH) e.g., for data on physical downlink shared channel (PDSCH), carry out radio resource management (RRM) measurements, etc.) and transmit on the uplink (transmit on physical uplink control channel (PUCCH), transmit on physical uplink shared channel (PUSCH) according to grants, transmit sounding reference signal (SRS), etc.).

In some embodiments, the WD 22 may determine whether two gaps are too close to each other in time according to a rule. When the two gaps are too close to each other then the WD 22 cancels one of the gaps. The term cancelling of a gap may also be called as discarding, dropping, abandoning a gap etc.

In some embodiments, the closeness of the gaps can be determined by one or more metric or parameter with certain threshold e.g.:

- Comparing the magnitude of the difference (T11−T21) between the starting points in time of the individual gaps in time with certain threshold (Δ).
- Comparing the magnitude of the difference (T11−T22) between the starting point in time (T11) of the gap in a first MGP and the ending point in time (T22) of the gap in a second MGP with certain threshold (α).
- Comparing the magnitude of the difference (T12−T21) between the ending point in time (T12) of the gap in a first MGP and the starting point in time (T21) of the gap in a second MGP with certain threshold (β).

Examples of rules for the WD 22 to determine whether two gaps are too close to each other in time are given below:

- According to one rule, gaps may be too close to each other if the starting points of the individual gaps are apart in time by less than certain threshold (Δ), which may be expressed in certain time units (e.g., ms) or time resources (e.g., symbols, slots, subframes etc.), e.g., Δ=15 or 20 ms.
  - For Scenario A, this may be e.g., when for any set of integers N1 and N2, |(MGO1+N1×MGRP1)−(MGO2+N2×MGRP2)|<Δ.
  - For Scenario B, this may be e.g., when |MGO1−MGO2|<Δ.

In other words, when the magnitude of the difference in measurement gap starting positions is less than Δ, the WD 22 decides to cancel one of the gaps.

- According to another rule, the value of Δ may depend on system configuration with respect to duplex mode, SCS, slot duration, CP (cyclic prefix) length, TDD configuration, etc., on at least one of the carriers. For instance, if all aggregated carriers are using FDD (frequency division duplex) duplex mode (i.e., not a single aggregated carrier is using TDD duplex mode), the value of Δ may be smaller than if one or more of the aggregated carriers are using TDD duplex mode. In one example Δ is smaller for a smaller SCS compared to the value of Δ for larger SCS. For example Δ=10 ms for SCS=15 kHz and Δ=20 ms for SCS=120 kHz etc.
- According to another rule, the value of Δ may additionally depend on the measurement gap lengths MGL1 and MGL2. For instance, if the aggregated length of MGL1 and MGL2 is smaller than some threshold, i.e., MGL1+MGL2<TAL, then a Δ smaller value may apply than otherwise applicable.
- According to another rule, gaps may be too close to each other if the starting points of the individual gaps are less than Δ ms apart, where Δ is provided by the network node 16 through signaling e.g., measurement control information provided in a RRC message, or more dynamic information provided through MAC (medium access control) signalling or DCI (downlink control information).
- According to another rule, the value of Δ may be configured by the network node 16. In this case the WD 22 will use the configured value of Δ to determine whether the gaps are too close to each other in time or not.
- According to another rule, the value of Δ may depend on the buffer size. In case of larger buffer size larger value of Δ may be used compared to the value of Δ when the buffer size is smaller. This will enable the WD 22 to drop or cancel gaps even if they are not too close when the WD 22 has substantial outstanding traffic to transmit. For example, if the buffer size is above threshold (β1) then Δ=δ1; otherwise Δ=δ2; where δ1>δ2. The parameters B1, δ21 and δ2 can be pre-defined or configured by the network node 16.
- According to another rule, the value of Δ may depend on whether there is an ongoing data transmission (e.g., PDCCH reception, PDSCH reception, PUCCH transmission, PUSCH transmission, etc.) between the WD 22 and one or more serving cells while the WD 22 is configured with concurrent gaps. The data transmission (or simply transmission) may comprise for example if there is any of: a first data block transmission, retransmission of data block, ongoing HARQ process, scheduling grants for UL and/or DL transmissions the current time resource (e.g., slot) or future time resources (e.g., next n slots) etc. In one example a HARQ process is considered to be ongoing until the data block is correctly received by the WD 22 e.g., WD 22 has transmitted ACK. In another example a HARQ process is considered to be ongoing until the WD 22 has received more than N retransmissions (or redundancy versions) of first data block (e.g., N can be maximum number of retransmissions). In another example a HARQ process is considered to be ongoing until the HARQ retransmission timer is running. In one example the value of Δ is the same regardless of type of transmission e.g., DL and/or UL transmissions, retransmissions etc. In another example WD 22 may determine the value of Δ based on type of transmission as described in one or more of the following:
  - In one example if there is only an ongoing UL transmission then Δ=Δ1.
  - In another example if there is only an ongoing DL transmission then Δ=Δ2.
  - In another example if there is ongoing UL transmission and DL transmission then Δ=Δ3.
  - In another example if the number of retransmissions for a data block sent by the WD 22 exceeds certain threshold Δ=Δ4.
  - In another example if the number of NACKs transmitted by the WD 22 in the last certain time period (Tx1) exceeds certain threshold then Δ=Δ5.
  - In another example if the number of BLER (block error rate) for downlink data reception at the WD 22 in the last certain time period (Tx2) exceeds certain threshold then Δ=Δ6.

In the above examples the parameters Δ1, Δ2, Δ3, Δ4, Δ5, Δ6, Tx1, Tx2 etc., can be pre-defined or configured by the network node 16.

- According to another rule, the value of Δ may depend on the type of traffic used for data transmission in DL and/or in UL e.g., eMBB (evolved mobile broadband), URLLC (ultra-reliable low-latency communication), voice traffic, extended reality (XR) traffic type, emergency service (e.g., IP Multimedia Subsystem (IMS) emergency bearer services) etc. Examples of XR are augmented reality (AR), virtual reality (VR) etc. URLLC and XR may require very low latency for transmitting packet. For example Δ is larger for the traffic type which requires or associated with shorter data transmission latency compared to the case when the traffic type requires or is associated with longer data transmission latency. In one example Δ=Δ11 and Δ=Δ12 if the WD 22 is configured to operate eMBB traffic type and URLLC traffic type respectively; where Δ11<Δ12. In another example Δ=Δ11 and Δ=Δ13 if the WD 22 is configured to operate eMBB traffic type and XR traffic type respectively; where Δ11<Δ13.

In some embodiments, the WD 22 may determine which of the two measurement gaps to keep according to a rule. For Scenario A, which gap to keep may for instance depend on the relation between MGRP1 and MGRP2. For instance, one rule may apply if MGRP2=2×MGRP1, and another rule when MGRP2>2×MGRP1. For Scenario B, which gap to keep may be determined by yet another rule, since here MGRP1=MGRP2, i.e., if conflicts arise, they arise for every measurement gap.

- According to one rule, when MGRP1=MGRP2 the WD 22 alternates between keeping measurement gap from MGP1 and measurement gap from MGP2. The WD 22 may start e.g., by keeping the measurement gap with smallest measurement gap offset MGO, and starting counting from a well-defined border e.g., SFN 0: first gap that would follow after SFN 0 would be from MGP1, next gap would be from MGP2, and so on.
  - Alternatively, the WD 22 may apply a rule that if modulo(SFN, MGRP1/10) is an even number, WD 22 keeps measurement gap from the MGL1, otherwise from MGL2.
  - Alternatively, they may not take into account whether MGO1 is smaller than MGO2. The point here is that the rule applied by the WD 22 gives a well-defined and predictable behaviour.
  - Other examples of well-defined borders may for instance be the first occurrence of a concurrent gap from MGP2, or the start of the MGRP2 containing the first concurrent gap from MGP2 at offset MGO2 into it.
- According to one rule, when MGRP2=2×MGRP1, the WD 22 alternates between keeping measurement gap from MGP1 and MGP2. The WD 22 may start counting from a well-defined border e.g., SFN 0, and at first conflict would keep measurement gap from MGL2, at next conflict would keep measurement gap from MGL1, and so on.
  - Alternatively, the WD 22 may apply a rule that if modulo(SFN, max(MGRP1,MGRP2)/10) is an even number, WD 22 keeps measurement gap from MGP2, otherwise from MGP1.
- According to another rule, when MGRP2=2×MGRP1, the WD 22 always keeps measurement gaps for MGP2 i.e., for the sparser MGP. The consequence is that every second measurement gap used by the WD 22 will be from MGP1 and every second from MGP2, despite that MGRP2 is twice as long as MGRP1.
- According to one rule, when MGRP2>2×MGRP1, the WD 22 always keeps measurement gaps for MGP2 i.e., for the sparser MGP.
- According to another rule the WD 22 cancels a particular gap among the two gaps. In one example, the WD 22 cancels the first gap occurring in time. In another example, the WD 22 cancels the second gap occurring in time.
- According to another rule the WD 22 is explicitly configured by the network node 16 which one of the gaps the WD 22 will cancel when the gaps are too close to each other. For example, the WD 22 is configured by the network node 16 with an identifier of the gap to be cancelled e.g., gap of MGP1, or gap of MGP2 etc.
- According to another rule the WD 22 cancels a gap based on the usage of the gaps e.g., measurement purpose, types of measurements, types of RATs for measurements etc. Different MGPs may be configured for performing different types of measurements e.g., SSB based measurements, CSI-RS (channel state information reference signals) based measurements, positioning measurements (e.g., measurements done on PRS (Positioning reference signals) signals etc.). For example, the WD 22 can be configured to cancel the gaps used for certain types of measurements e.g., CSI-RS based measurements. But it is not allowed to cancel the gaps for some other types of measurements e.g., PRS based measurements.
- According to another rule the WD 22 cancels a gap based on the measurement gap configuration parameters e.g., measurement gap offset, MGL etc. In one example the WD 22 cancels the gap with larger MGL. In another example the WD 22 cancels the gap with smaller MGL.
- According to another rule the WD 22 cancels a gap based on the measurement configuration associated with measurements performed using different MGPs e.g., SMTC (SSB measurement timing configuration) periodicity, SSB periodicity, PRS resource periodicity, number of carriers configured for measurements using gaps etc.
  - For example, the WD 22 can cancel gap which is used for performing measurements on carriers where SMTC periodicity is below or equal to certain threshold (e.g., 40 ms).
  - In another example the WD 22 can cancel gap which is used for performing measurements on number of carriers below certain threshold e.g., 4.
  - In another example the WD 22 can cancel gap which is used for performing measurements on non-serving carriers and not the one which is used for performing measurements on serving carriers.
  - In another example the WD 22 can cancel gap which is used for performing measurements on inter-RAT carriers and not the one which is used for performing measurements on intra-frequency and/or inter-frequency carriers.

Alternative WD Embodiment

According to another version of the WD 22 embodiment, WD 22 may handle the conflict in different ways depending on whether the conflicting gaps are non-overlapping, partially overlapping (i.e., aggregated measurement gap length<MGL1+MGL2), or fully overlapping (i.e., aggregated measurement gap length=max(MGL1, MGL2).

In some embodiments, when fully non-overlapping, WD 22 may cancel gaps as described in the WD 22 embodiment above.

In some embodiments, when fully overlapping, the WD 22 may keep both gaps (i.e., resulting measurement gap length when conflicts arise is always max(MGL1, MGL2)), and instead use other sharing mechanisms, e.g., CSSF (carrier specific scaling factor), for determining what measurement to conduct in each such gap. Alternatively, the WD 22 may use other concurrent gap sharing mechanism as indicated by the network node 16, e.g., through a RRC message, to determine which gap shall be canceled. Alternatively, the WD 22 may conduct parallel measurements, such as one frequency layer will be measured in MGL1, one frequency later will be measured in MGL2.

For partially overlapping case, a rule may be used for determining whether the case shall be handled the same way as for fully non-overlapping case or as for fully overlapping case.

- According to one rule, partially overlapping case is always handled in the same was as non-overlapping case.
- According to another rule, partially overlapping case is always handled in the same was as fully overlapping case.
- According to another rule, whether to handle the partially overlapping case in the same way as fully non-overlapping case or fully overlapping case further depends on the relation between the measurement gaps.
  - As one example of such rule, if the overlapping between the conflicting gaps is less than some value, the case is handled in the same way as for fully non-overlapping case; otherwise it is handled in the same way as for fully overlapping case.
  - If MGL1=6 ms and MGL2=6 ms and aggregated gap length would 10 ms, then the overlap is 2 ms and comprises 2/10=20%. The rule may for instance specify that if the overlap is larger than Z1%, e.g., 25%, the case shall be handled in the same way as for the fully overlapping case; otherwise it shall be handled in the same way as for the fully non-overlapping case.
  - As another example of such rule, there may additionally be requirement on the relation between the two measurement gap lengths MGL1 and MGL2.
  - If MGL1=10 ms and MGL2=3 ms, then the ratio min(MGL1,MGL2)/max(MGL1,MGL2)=30%. The rule may for instance specify that if the overlap is larger than Z1%, and the ratio between the smaller and the larger of MGL1 and MGL2 is larger than Z2%, e.g., 50%, then the case shall be handled in the same way as for the fully overlapping case; otherwise it shall be handled in the same way as for the fully non-overlapping case.
  - As another example of such rule, the WD 22 may follow a configuration provided by the network node 16 e.g., through a RRC message. I.e., the network node 16 indicates to the WD 22 whether the partially overlapping case shall be handled in same way as the fully non-overlapping case or fully overlapping case.

EXAMPLES

Figure 16:
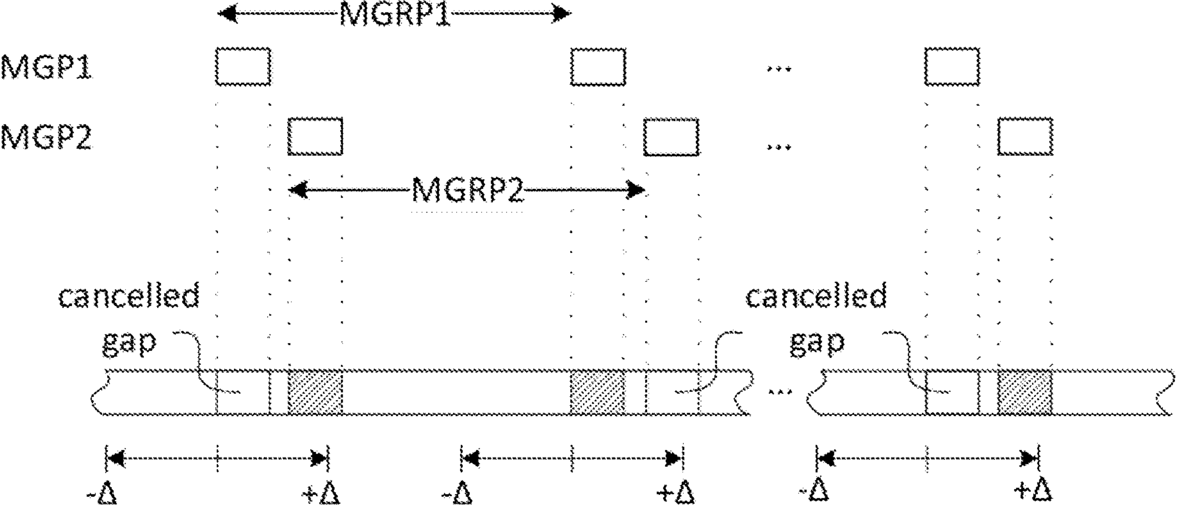
FIG. 16 is an example of WD cancelling gaps in Scenario B i.e. when MGRP1=MGRP2 according to some embodiments.
Figure 17:
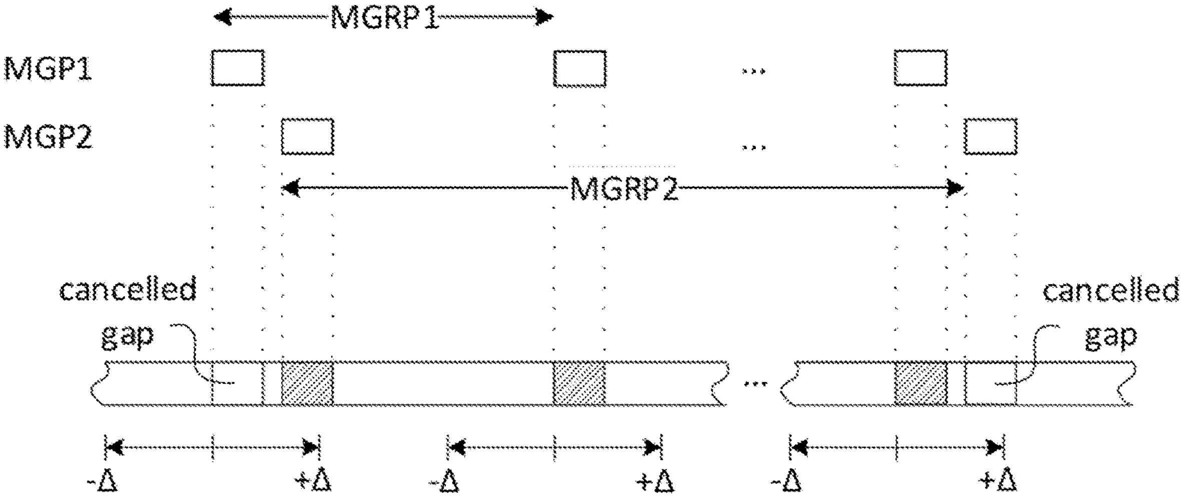
FIG. 17 is an example of WD cancelling gaps in Scenario A when MGRP2=2×MGRP1, where the WD alternates between cancelling a gap from MGP1 and MGP2, according to some embodiments.
Figure 18:
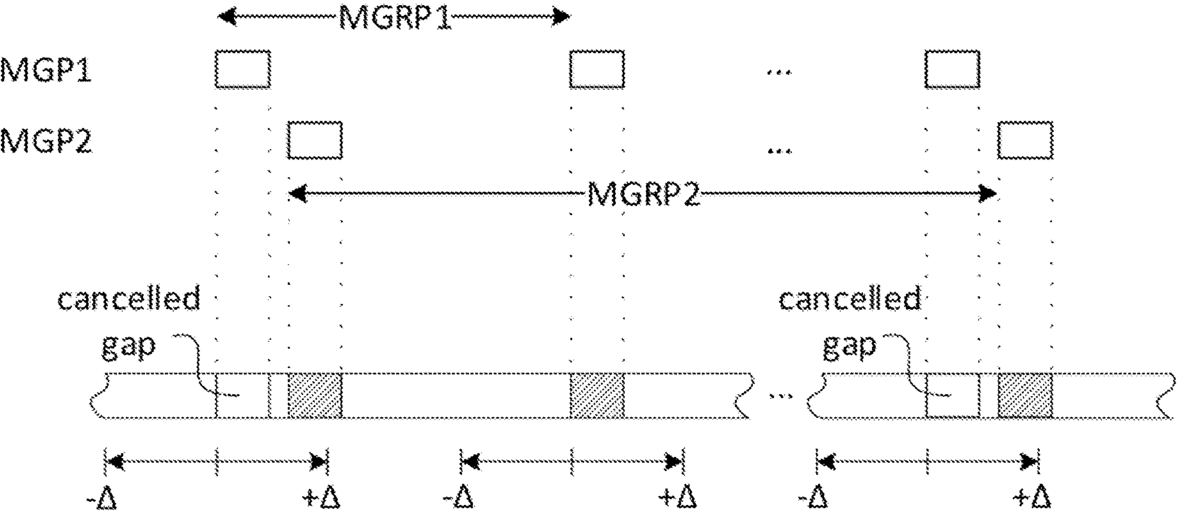
FIG. 18 is an example of WD cancelling gaps in Scenario A when MGRP2>2×MGRP1, where the WD always cancels a gap from MGP1, according to some embodiments.

Examples are provided in FIGS. 16-18.

FIG. 16 shows gap cancellations in Scenario B i.e., where MGRP1=MGRP2, where the WD 22 finds that starting points of the gaps are less than Δms apart, and therefore alternates between cancelling measurement gaps from MGP1 and MGP2.

FIG. 17 shows gap cancellations in Scenario A where MGRP2=2×MGRP1, where the WD 22 finds that starting points of the gaps are less than Δms apart, and therefore alternates between cancelling measurement gaps from MGP1 and MGP2.

FIG. 18 shows gap cancellation in Scenario A where MGRP2>2×MGRP1, where the WD 22 finds that starting points of the gaps are less than Δ ms apart, and therefore consistently cancels measurement gaps from MGP1 only.

Steps in a WD 22

Figure 19:
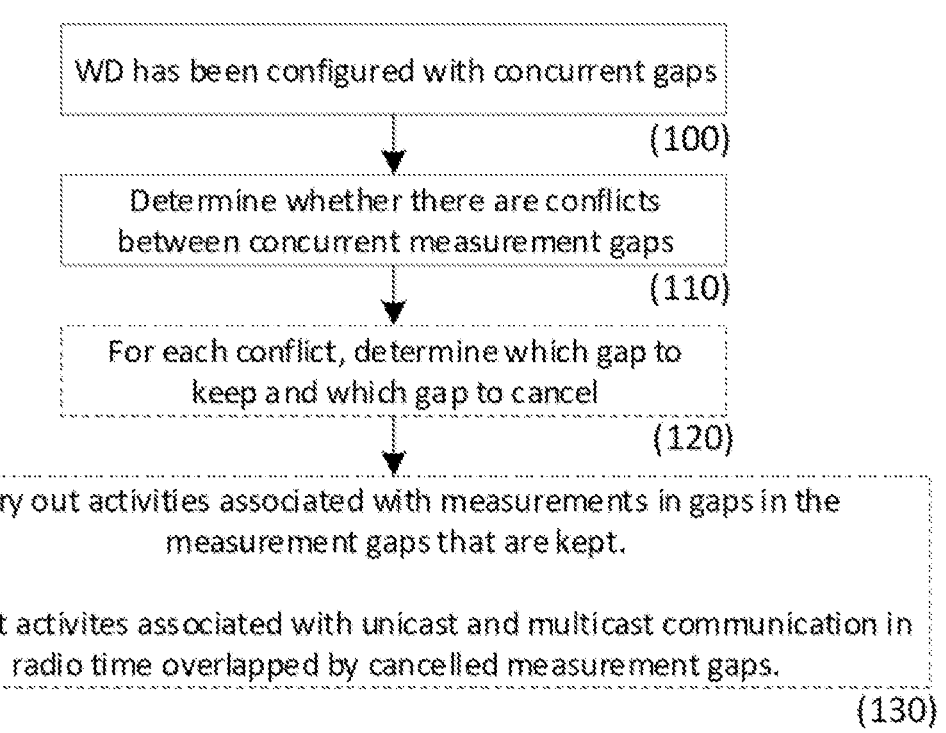
FIG. 19 is an example flow chart for steps in a WD according to some embodiments.

FIG. 19 is a flow chart of steps performed by a WD 22 according to some embodiments. The steps may include:

- (100) The WD has been configured with concurrent gaps
- (110) Determine that measurement gap conflicts will arise
- (120) Determine for each conflict which measurement gap to keep
- (130) Carry out activities associated with measurements in gaps in kept measurement gaps
- (130) Carry out activities associated with unicast and/or multicast communication in cancelled measurement gaps (e.g., PDCCH monitoring, PDSCH reception, intra-frequency RRM measurements, PUCCH transmission, PUSCH transmission, SRS transmission, etc.).

Method in a Network Node

A network node 16 that takes measurement gaps into account in the scheduling, i.e., which allocates the WD 22 for uplink transmission and/or downlink reception only outside radio time used for measurement gaps, follows essentially the same rules as the WD 22 above.

The network node 16 determines whether two gaps are too close to each other according to the same rule or set of rules as used by the WD 22.

When conflict between gaps arises, the network node 16 determines which of the two gaps to keep, and which of the two gaps to cancel. The network node 16 may continue to schedule the WD 22 on downlink and uplink during radio time that is overlapped by the cancelled measurement gap. Whether the network node 16 schedules the WD 22 during the radio time overlapped by the cancelled measurement gaps may further depend on whether there is data in buffers to transmit to/from WD 22, the network node 16 load situation, the latency tolerated by the services provided to the WD 22 (e.g., whether WD 22 is operating according to low-latency requirements or not), etc.

Steps in a Network Node 16

Figure 20:
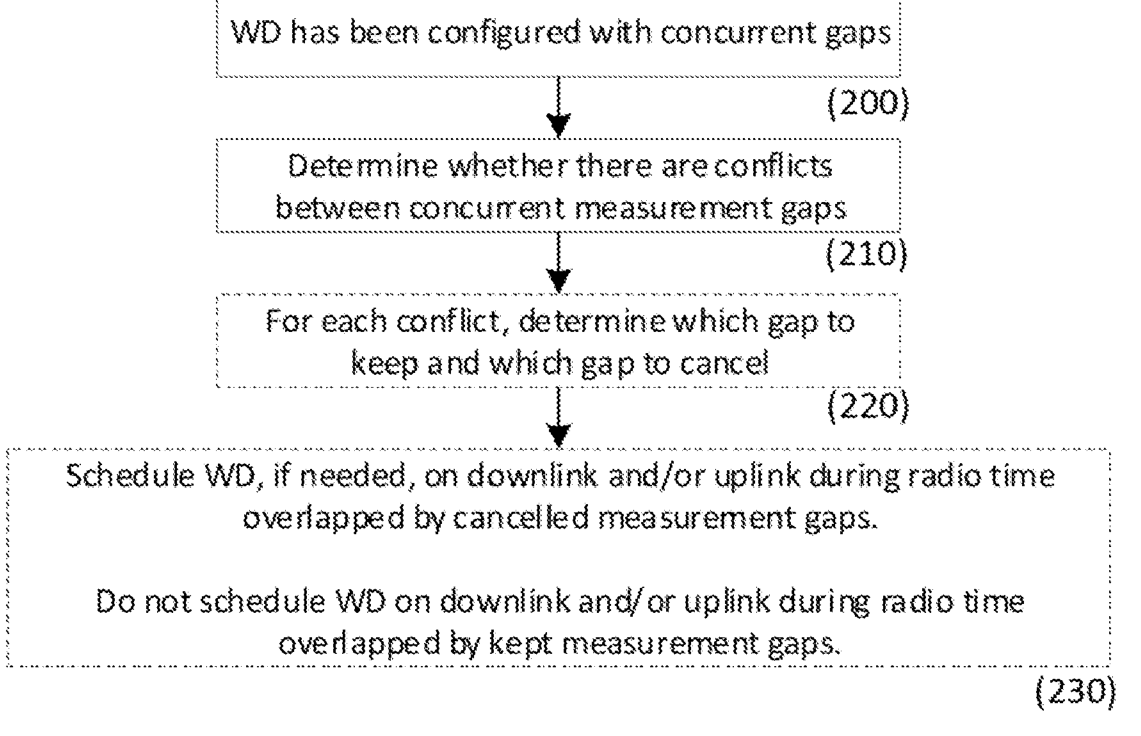
FIG. 20 is an example flow chart for steps in a network node according to some embodiments.

FIG. 20 is a flow chart of steps performed by a network node 16 according to some embodiments. The steps may include:

- (200) The WD has been configured with concurrent gaps
- (210) Determine that measurement gap conflicts will arise
- (220) Determine for each conflict which measurement gap to keep
- (230) Do not schedule WD 22 during radio time that is overlapped by kept measurement gaps.
- (230) If called for, continue to schedule WD 22 on downlink and/or uplink during radio time that is overlapped by the cancelled measurement gaps.

Further Description

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

EMBODIMENTS

Embodiment A1. A network node configured to communicate with a wireless device (WD), the network node configured to, and/or comprising a radio interface and/or comprising processing circuitry configured to:

determine whether two measurement gaps in a concurrent measurement gap pattern are close to each other in time; and based on the determination, determine whether to permit the WD to use the two measurement gaps.

Embodiment A2. The network node of Embodiment A1, wherein the network node and/or the radio interface and/or the processing circuitry is configured to determine whether the two measurement gaps are close to each other time based on a threshold value.

Embodiment A3. The network node of Embodiment A1, wherein the network node and/or the radio interface and/or the processing circuitry is configured to determine whether to permit the WD to use the two measurement gaps:

when the two measurement gaps are close to each other, cancel the at least one measurement gap and/or determine to schedule the WD in the at least one measurement gap; and when the two measurement gaps are not close to each other, determine to avoid scheduling the WD in the at least measurement gap.

Embodiment B1. A method implemented in a network node, the method comprising:

determining whether two measurement gaps in a concurrent measurement gap pattern are close to each other in time; and based on the determination, determining determine whether to permit the WD to use the two measurement gaps.

Embodiment B2. The method of Embodiment B1, wherein determining whether the two measurement gaps are close to each other time based on a threshold value.

Embodiment B3. The method of Embodiment B1, wherein determining whether to permit the WD to use the two measurement gaps comprises:

when the two measurement gaps are close to each other, cancelling the at least one measurement gap and/or determining to schedule the WD in the at least one measurement gap; and when the two measurement gaps are not close to each other, determining to avoid scheduling the WD in the at least measurement gap.

Embodiment C1. A wireless device (WD) configured to communicate with a network node, the WD configured to, and/or comprising a radio interface and/or processing circuitry configured to:

determine whether two measurement gaps in a concurrent measurement gap pattern are close to each other in time; and based on the determination, determine whether to use the two gaps for performing measurements.

Embodiment C2. The WD of Embodiment C1, wherein the WD and/or the radio interface and/or the processing circuitry is configured to determine whether the two measurement gaps are close to each other time based on a threshold value.

Embodiment C3. The WD of Embodiment C1, wherein the network node and/or the radio interface and/or the processing circuitry is configured to determine whether to permit the WD to use the two measurement gaps:

when the two measurement gaps are close to each other, cancel the at least one measurement gap and/or avoid performing measurements during the cancelled at least one measurement gap; and when the two measurement gaps are not close to each other, determine to use the at least measurement gap to perform measurements.

Embodiment D1. A method implemented in a wireless device (WD), the method comprising:

determining whether two measurement gaps in a concurrent measurement gap pattern are close to each other in time; and based on the determination, determining whether to use the two gaps for performing measurements.

Embodiment D2. The method of Embodiment D1, further comprising determining whether the two measurement gaps are close to each other time based on a threshold value.

Embodiment D3. The method of Embodiment D1, wherein determining whether to use the two gaps for performing measurements comprises:

when the two measurement gaps are close to each other, cancelling the at least one measurement gap and/or avoid performing measurements during the cancelled at least one measurement gap; and when the two measurement gaps are not close to each other, determining to use the at least measurement gap to perform measurements.

The invention claimed is:

1. A method implemented in a wireless device, WD, which has been configured with concurrent measurement gap patterns, the method comprising:

determining that one or more measurement gap conflicts will arise such that two measurement gaps in the concurrent measurement gap patterns are too close to each other in time;

determining, for each measurement gap conflict, which measurement gap to keep and which of the two measurement gaps to cancel; and based on the determination, performing measurements using the kept measurement gap.

2. The method of claim 1, wherein the concurrent measurement gap patterns include a first measurement gap pattern and a second measurement gap pattern, wherein determining whether two measurement gaps in the concurrent measurement gap patterns are too close to each other in time comprises one or both:

comparing a difference between an ending point in time of a measurement gap in the first measurement gap pattern and a starting point in time of a measurement gap in the second measurement gap pattern to a threshold value; and comparing a difference between an ending point in time of a measurement gap in the second measurement gap pattern and a starting point in time of a measurement gap in the first measurement gap pattern to a threshold value.

3. The method of claim 1, wherein determining whether two measurement gaps in the concurrent measurement gap patterns are too close to each other in time comprises:

determining that the two measurement gaps are too close to each other in time if the two measurement gaps at least partially overlap.

4. The method of claim 1, wherein determining whether to use the two measurement gaps for performing measurements comprises:

if the two measurement gaps are too close to each other in time, one or both cancelling at least one of the two measurement gaps and avoiding performing measurements associated with at least one of the two measurement gaps; and if the two measurement gaps are not too close to each other in time, using both of the two measurement gaps to perform measurements.

5. The method of claim 1, wherein determining whether to use the two measurement gaps for performing measurements comprises:

if the two measurement gaps are too close to each other in time, one or both cancelling one of the two measurement gaps and avoiding performing measurements associated with one of the two measurement gaps, and using the other one of the two measurement gaps to perform measurements; and if the two measurement gaps are not too close to each other in time, using both of the two measurement gaps to perform measurements.

6. The method of claim 1, wherein the two measurement gaps are non-overlapping, wherein determining whether to use the two measurement gaps for performing measurements comprises:

if the two measurement gaps are too close to each other in time, cancelling at least one of the two measurement gaps and avoiding performing measurements during at least one of the two measurement gaps; and if the two measurement gaps are not too close to each other in time, using both of the two measurement gaps to perform measurements.

7. The method of claim 1, wherein the two measurement gaps are non-overlapping, wherein determining whether to use the two measurement gaps for performing measurements comprises:

if the two measurement gaps are too close to each other in time, performing one or more actions in at least one of the two measurement gaps;

if the two measurement gaps are not too close to each other in time, using both of the two measurement gaps to perform measurements; and wherein the one or more actions include one or more from a group consisting of:

monitoring a physical downlink control channel, PDCCH;

receiving data on a physical downlink shared channel, PDSCH;

transmitting on a physical uplink control channel, PUCCH;

transmitting on a physical uplink shared channel, PUSCH; and transmitting a sounding reference signal, SRS.

8. The method of claim 1, wherein the two measurement gaps are non-overlapping, wherein determining whether to use the two measurement gaps for performing measurements comprises:

if the two measurement gaps are too close to each other in time, performing one or more actions in one of the two measurement gaps and using the other one of the two measurement gaps to perform measurements;

if the two measurement gaps are not too close to each other in time, using both of the two measurement gaps to perform measurements; and wherein the one or more actions include one or more from a group consisting of:

monitoring a physical downlink control channel, PDCCH;

receiving data on a physical downlink shared channel, PDSCH;

transmitting on a physical uplink control channel, PUCCH;

transmitting on a physical uplink shared channel, PUSCH; and transmitting a sounding reference signal, SRS.

9. The method of claim 4, wherein the measurements performed during the two measurement gaps if the two measurement gaps are not too close to each other in time are based on one or both of:

synchronization signal blocks, SSB, and positioning reference signals, PRS.

10. The method of claim 1, comprising:

if the two measurement gaps in the concurrent measurement gap patterns are too close to each other in time, determining which of the two measurement gaps to use for measurements, wherein which of the two measurement gaps to use for measurements is determined based on a configuration from a network node, or based on an indication from a network which measurement gap to prioritize.

11. A wireless device, WD, configured to communicate with a network node, the WD comprising a radio interface and processing circuitry configured to:

be configured with concurrent measurement gap patterns;

determine that one or more measurement gap conflicts will arise such that two measurement gaps in the concurrent measurement gap patterns are too close to each other in time;

determine, for each measurement gap conflict, which measurement gap to keep and which of the two measurement gaps to cancel; and based on the determination, perform measurements using the kept measurement gap.

12. The WD of claim 11, wherein the concurrent measurement gap patterns include a first measurement gap pattern and a second measurement gap pattern, wherein determining whether two measurement gaps in the concurrent measurement gap patterns are too close to each other in time comprises one or both:

comparing a difference between an ending point in time of a measurement gap in the first measurement gap pattern and a starting point in time of a measurement gap in the second measurement gap pattern to a threshold value; and comparing a difference between an ending point in time of a measurement gap in the second measurement gap pattern and a starting point in time of a measurement gap in the first measurement gap pattern to a threshold value.

13. A method implemented in a network node, the network node being configured to communicate with a wireless device, WD, which has been configured with concurrent measurement gap patterns, the method comprising:

determining that one or more measurement gap conflicts will arise such that two measurement gaps in the concurrent measurement gap patterns are too close to each other in time;

determining, for each measurement gap conflict, which measurement gap to keep and which of the two measurement gaps to cancel; and based on the determination, determining whether to permit the WD to use the kept measurement gap for measurements.

14. The method of claim 13, wherein the concurrent measurement gap patterns include a first measurement gap pattern and a second measurement gap pattern, wherein determining whether two measurement gaps in the concurrent measurement gap patterns are too close to each other in time comprises one or both:

comparing a difference between an ending point in time of a measurement gap in the first measurement gap pattern and a starting point in time of a measurement gap in the second measurement gap pattern to a threshold value; and comparing a difference between an ending point in time of a measurement gap in the second measurement gap pattern and a starting point in time of a measurement gap in the first measurement gap pattern to a threshold value.

15. The method of claim 13, wherein determining whether two measurement gaps in the concurrent measurement gap patterns are too close to each other in time comprises:

determining that the two measurement gaps are too close to each other in time if the two measurement gaps at least partially overlap.

16. The method of claim 13, wherein determining whether to permit the WD to use the two measurement gaps for performing measurements comprises:

if the two measurement gaps are too close to each other in time, one or both cancelling at least one of the two measurement gaps and scheduling the WD in at least one of the measurement gaps; and if the two measurement gaps are not too close to each other in time, avoiding scheduling the WD in the two measurement gaps.

17. The method of claim 13, wherein determining whether to permit the WD to use the two measurement gaps for performing measurements comprises:

if the two measurement gaps are too close to each other in time, one or both cancelling one of the two measurement gaps and scheduling the WD in one of the measurement gaps, and allowing the WD to use the other one of the two measurement gaps to perform measurements; and if the two measurement gaps are not too close to each other in time, avoiding scheduling the WD in the two measurement gaps.

18. The method of claim 13, wherein the two measurement gaps are non-overlapping, wherein determining whether to permit the WD to use the two measurement gaps for performing measurements comprises:

if the two measurement gaps are too close to each other in time, one or both cancelling at least one of the two measurement gaps and scheduling the WD in at least one of the measurement gaps; and if the two measurement gaps are not too close to each other in time, avoiding scheduling the WD in the two measurement gaps.

19. The method of claim 13, wherein the two measurement gaps are non-overlapping, wherein determining whether to permit the WD to use the two measurement gaps for performing measurements comprises:

if the two measurement gaps are too close to each other in time, one or both cancelling one of the two measurement gaps and scheduling the WD in one of the measurement gaps, and allowing the WD to use the other one of the two measurement gaps to perform measurements; and if the two measurement gaps are not too close to each other in time, avoiding scheduling the WD in the two measurement gaps.

20. The method of claim 13, comprising:

if the two measurement gaps in the concurrent measurement gap patterns are too close to each other in time, determining which of the two measurement gaps to permit the WD to use for measurements, and configuring the WD with which of the two measurement gaps to use for measurements.

* * * * *